(12) United States Patent
Okude

(10) Patent No.: US 12,716,476 B2
(45) Date of Patent: Aug. 25, 2026

(54) TRANSMISSION APPARATUS

(71) Applicant: KANZAKI KOKYUKOKI MFG. CO., LTD., Amagasaki (JP)

(72) Inventor: Kohei Okude, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 0 days.

(21) Appl. No.: 19/060,939

(22) Filed: Feb. 24, 2025

(65) Prior Publication Data

US 2025/0271052 A1 Aug. 28, 2025

(30) Foreign Application Priority Data

Feb. 26, 2024 (JP) ................................ 2024-026318
Dec. 19, 2024 (JP) ................................ 2024-224164
Jan. 22, 2025 (JP) ................................ 2025-009358

(51) Int. Cl.
*F16H 47/04* (2006.01)
*F16H 61/12* (2010.01)
*F16H 61/4192* (2010.01)

(52) U.S. Cl.
CPC ............ *F16H 47/04* (2013.01); *F16H 61/12* (2013.01); *F16H 61/4192* (2013.01); *F16H 2061/1224* (2013.01)

(58) Field of Classification Search
CPC .. F16H 47/04; F16H 61/12; F16H 2061/1224; F16H 61/4192
See application file for complete search history.

(56) References Cited

U.S. PATENT DOCUMENTS

2020/0124170 A1* 4/2020 Iwaki .................... B60K 17/10

FOREIGN PATENT DOCUMENTS

JP 2001108060 A * 4/2001 ............ F16H 47/04
JP 2003130176 A * 5/2003 ............ F16H 47/04
JP 2013141983 A 7/2013

* cited by examiner

*Primary Examiner* — Tisha D Lewis
(74) *Attorney, Agent, or Firm* — CANTOR COLBURN LLP

(57) ABSTRACT

A transmission apparatus includes: a hydrostatic transmission that changes rotary power of an engine steplessly to output; a planetary gear mechanism that combines the rotary power of the engine and rotary power output from the hydrostatic transmission and outputs resultant power to a drive wheel; an input-side power transmission mechanism capable of transmitting the rotary power of the engine to the hydrostatic transmission and the planetary gear mechanism; and a controller configured to transmit the power from the engine to the drive wheel via the input-side power transmission mechanism and the planetary gear mechanism when the hydrostatic transmission is abnormal.

12 Claims, 23 Drawing Sheets

Figure 6:
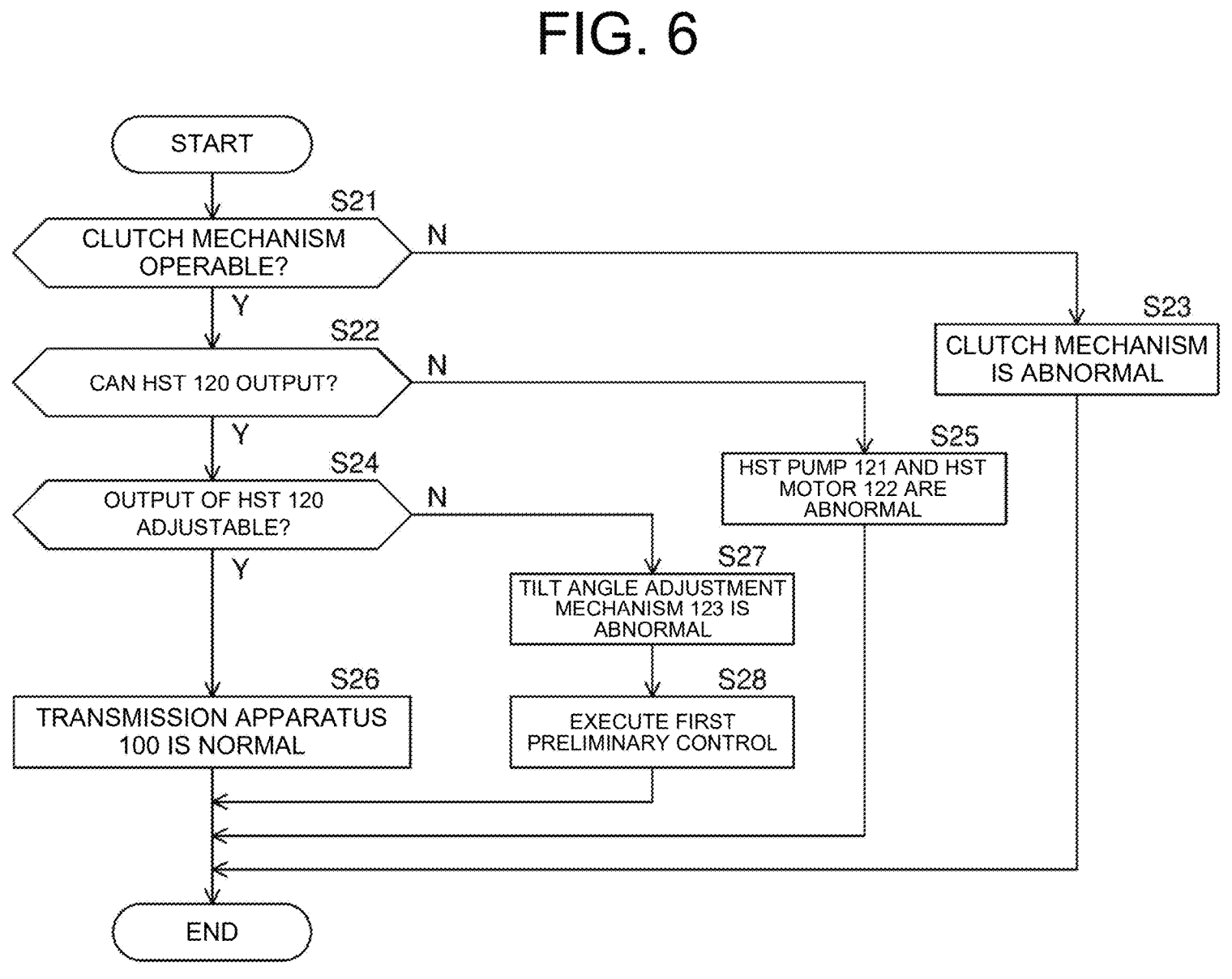

START

S21 CLUTCH MECHANISM OPERABLE?

Y

N

S23 CLUTCH MECHANISM IS ABNORMAL

S22 CAN HST 120 OUTPUT?

Y

N

S25 HST PUMP 121 AND HST MOTOR 122 ARE ABNORMAL

S24 OUTPUT OF HST 120 ADJUSTABLE?

Y

N

S27 TILT ANGLE ADJUSTMENT MECHANISM 123 IS ABNORMAL

S28 EXECUTE FIRST PRELIMINARY CONTROL

S26 TRANSMISSION APPARATUS 100 IS NORMAL

END

Figure 8:
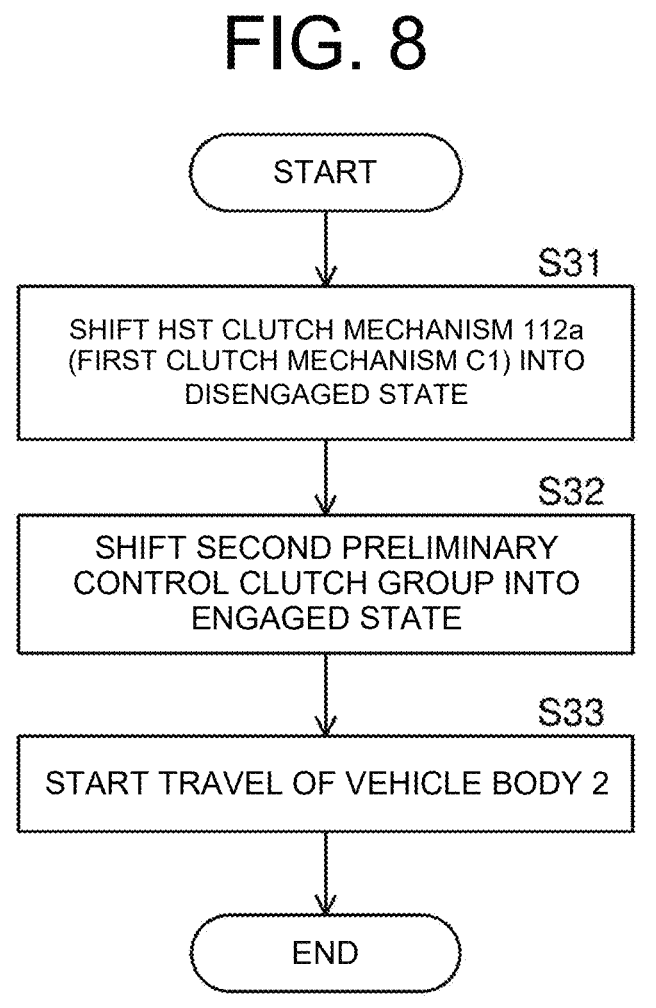

START

S31 SHIFT HST CLUTCH MECHANISM 112a (FIRST CLUTCH MECHANISM C1) INTO DISENGAGED STATE

S32 SHIFT SECOND PRELIMINARY CONTROL CLUTCH GROUP INTO ENGAGED STATE

S33 START TRAVEL OF VEHICLE BODY 2

END

FIG. 9

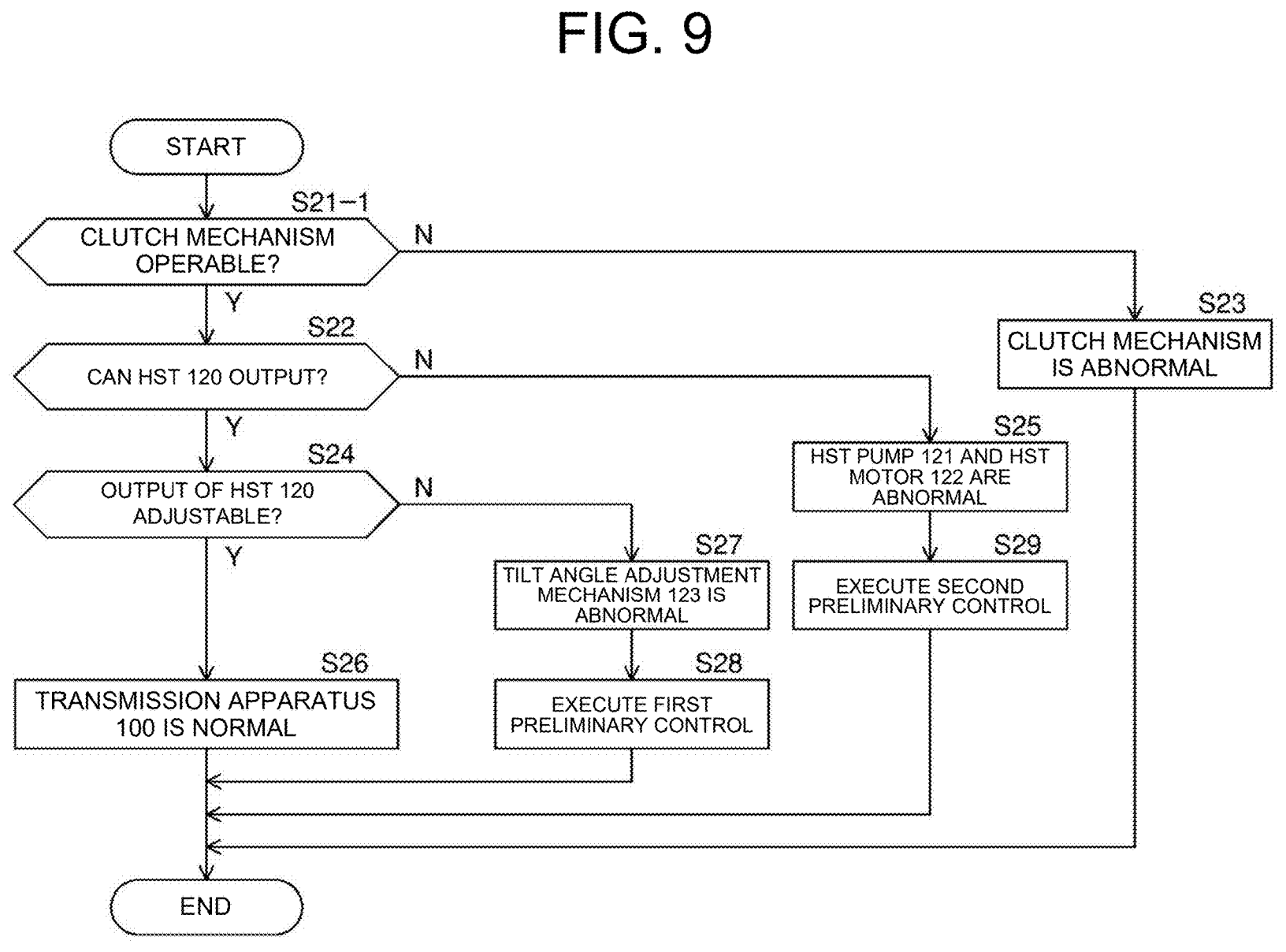

START

S21-1 CLUTCH MECHANISM OPERABLE?

Y

N

S22 CAN HST 120 OUTPUT?

Y

N

S24 OUTPUT OF HST 120 ADJUSTABLE?

Y

N

S23 CLUTCH MECHANISM IS ABNORMAL

S25 HST PUMP 121 AND HST MOTOR 122 ARE ABNORMAL

S29 EXECUTE SECOND PRELIMINARY CONTROL

S27 TILT ANGLE ADJUSTMENT MECHANISM 123 IS ABNORMAL

S28 EXECUTE FIRST PRELIMINARY CONTROL

S26 TRANSMISSION APPARATUS 100 IS NORMAL

END 1
100
110,100a
111
112
112a,C1,
115a,C3
113
113a,C2
114
114a
115
120,100a
120a
121
121a
121b
121c
122,120a
122a
122b
123
124
130,100a
131
132
133
134
134a
134b
140,100a
141
141a,C4
142
142a
143
144
144a
145
145a
145b
146
147
147a
148
149
149a,C5
150,100a
160,100a
170,100a
171
171a
172
22
22a
24b,24
24b1
24b2
25
25a
HP
RS
OS

TRANSMISSION APPARATUS

CROSS REFERENCE TO RELATED APPLICATIONS

The present invention claims priority under 35 U.S.C. § 119 to Japanese Application No. 2024-026318 filed Feb. 26, 2024; Japanese Application No. 2024-224164 filed Feb. 26, 2024, and Japanese Application No. 2025-009358 filed Jan. 22, 2025, the entire content of which is incorporated herein by reference.

TECHNICAL FIELD

The present invention relates to a transmission apparatus.

BACKGROUND ART

A transmission apparatus having a hydraulic mechanical transmission (HMT) that includes a hydrostatic transmission (HST) has been known as the related art (for example, see Patent Document 1).

PRIOR ART DOCUMENT

Patent Document

Patent Document 1: Japanese Unexamined Patent Application Publication No. 2013-141983

SUMMARY OF INVENTION

Technical Problem

By the way, in regard to the transmission apparatus of Patent Document 1, for example, when abnormality occurs to the HST, and the transmission apparatus no longer transmits rotary power of an engine to drive wheels at all, a work vehicle that is equipped with the transmission apparatus becomes unable to travel.

It takes a great deal of time and effort to move the work vehicle that has become unable to travel. Thus, it is desirable that, even when the HST is abnormal, the transmission apparatus transmits the power from the engine to the drive wheels so as to allow the work vehicle to travel even slightly.

However, when a basic configuration of the transmission apparatus is significantly changed to realize the above configuration, for example, high cost of the transmission apparatus and difficulty of mounting the transmission apparatus on the work vehicle are concerned.

The present invention has been made to solve the above problem, and therefore has a purpose of providing a transmission apparatus capable of transmitting power to drive wheels even when abnormality occurs to a hydrostatic transmission while keeping a basic configuration of the transmission apparatus.

Solution to Problem

A transmission apparatus according to an aspect of the present invention includes: a hydrostatic transmission that changes rotary power of an engine steplessly and output the changed power; a planetary gear mechanism that combines the rotary power of the engine and rotary power output from the hydrostatic transmission and outputs resultant power to a drive wheel; an input-side power transmission mechanism capable of transmitting the rotary power of the engine to the hydrostatic transmission and the planetary gear mechanism; and a controller that transmits the power from the engine to the drive wheel via the input-side power transmission mechanism and the planetary gear mechanism when the hydrostatic transmission is abnormal.

Advantageous Effects of Invention

According to the above configuration, while maintaining a basic configuration of the transmission apparatus, it is possible to transmit the power even when the abnormality occurs to the hydrostatic transmission.

BRIEF DESCRIPTION OF DRAWINGS

FIG. 1 is a left view illustrating a schematic configuration of a tractor as an example of a work vehicle that includes a transmission apparatus according to a first embodiment of the present invention.

FIG. 6 is a flowchart illustrating a flow of the execution determination of the first preliminary control.

FIG. 7 is a schematic view illustrating a configuration of a transmission apparatus in a second embodiment.

FIG. 8 is a flowchart illustrating a flow of second preliminary control.

FIG. 9 is a flowchart illustrating a flow of an execution determination of the second preliminary control.

FIG. 18 is a schematic view illustrating a configuration of a transmission apparatus in a modified example 3-2.

DESCRIPTION OF EMBODIMENTS

Figure 2:
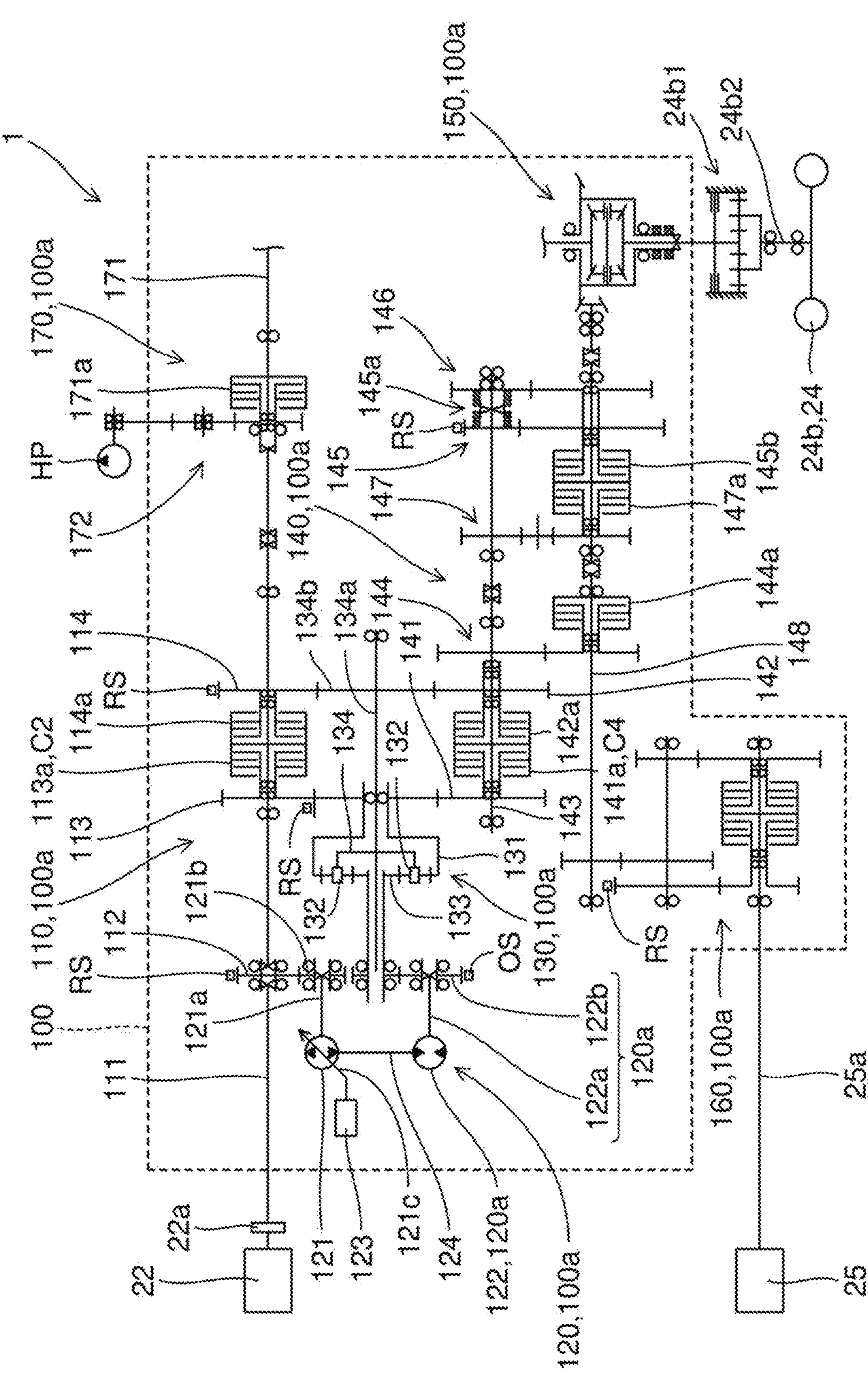
FIG. 2 is a schematic view illustrating a configuration of the transmission apparatus in the first embodiment.

A description will hereinafter be made on embodiments of the present invention with reference to the drawings.

In the following description, a description on a first embodiment, a second embodiment, and a third embodiment as specific examples of this embodiment will be made.

First Embodiment

1-1. Schematic Configuration of Work Vehicle

Figure 1:
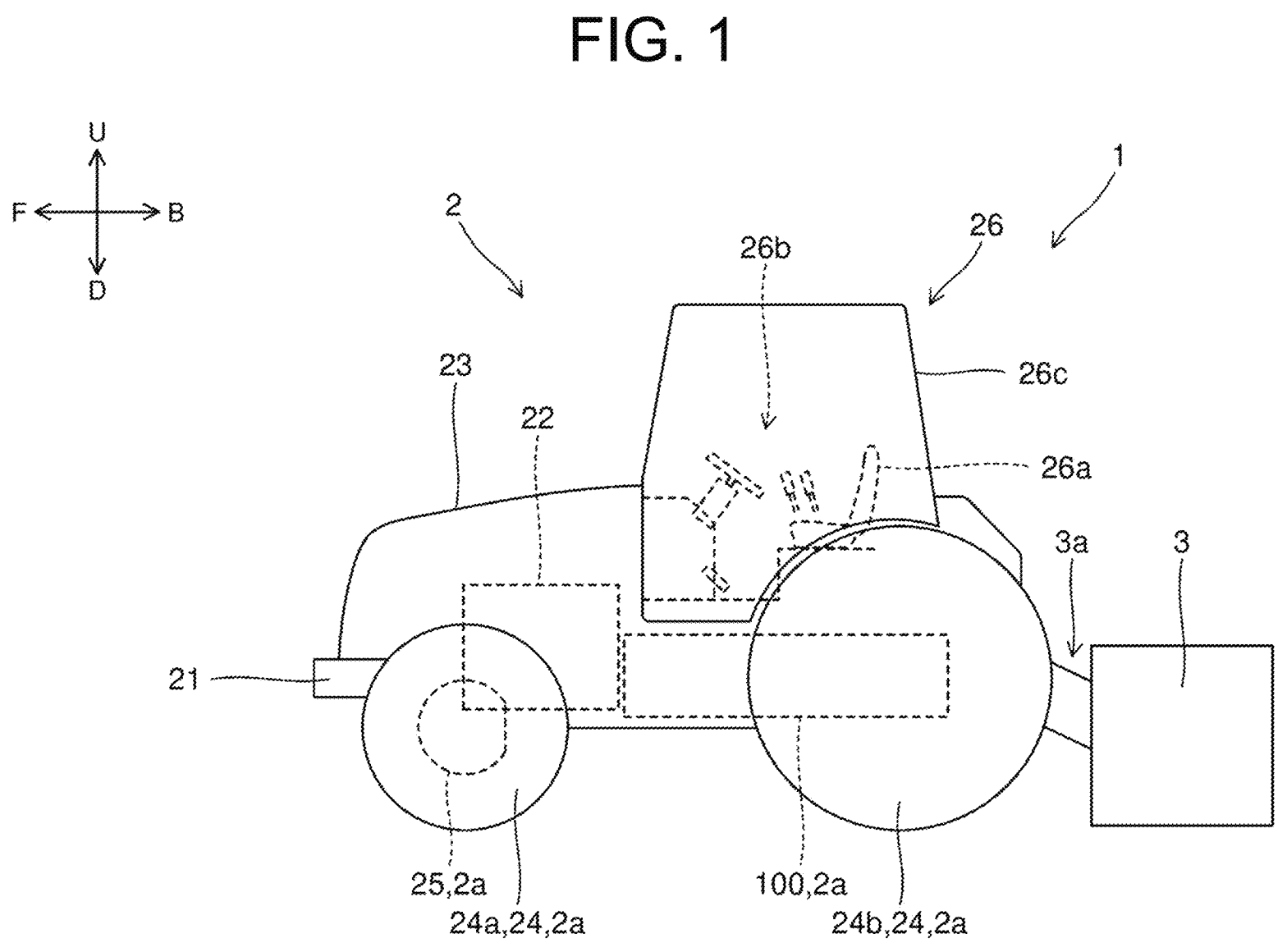

FIG. 1 is a left view illustrating a schematic configuration of a tractor 1 as an example of a work vehicle that includes a transmission apparatus according to the first embodiment of the present invention.

In these embodiments (the first embodiment, the second embodiment, and the third embodiment), the tractor 1 of a wheel (tire) type will be described as an example of the work vehicle. However, the work vehicle may be, in addition to the tractor 1, a rice transplanter, a combine harvester, a civil engineering and construction work device, a snowplow vehicle, or the like.

In addition, the tractor 1 is not limited to that of the wheel type but may be of a crawler type.

The tractor 1 includes a vehicle body 2 and a work machine 3.

In this embodiment, directions will be defined as follows.

A direction in which an operator (a driver or a manipulator) who is seated on a driver's seat 26*a* arranged in a driving unit 26 of the vehicle body 2 faces the front will be defined as "front", and an opposite direction thereto will be defined as "rear".

In addition, a left side and a right side as viewed from the operator who is seated on the driver's seat 26*a* will be defined as "left" and "right", respectively. Furthermore, a gravitational direction that is perpendicular to a front-rear direction and a right-left direction will be defined as an up-down direction, an upstream side and a downstream side in the gravitational direction will be defined as "up" and "down", respectively.

In the drawings, when necessary, a front side, a rear side, a right side, a left side, an up side, and a down side will be denoted by reference signs "F", "B", "R", "L", "U", and "D", respectively.

The vehicle body 2 includes a vehicle body frame 21, an engine 22, a hood 23, drive wheels 24, a front axle device 25, the driving unit 26, and a transmission apparatus 100.

The vehicle body frame 21 is configured to include plural metal members that are joined by welding or the like.

The vehicle body frame 21 supports the transmission apparatus 100.

A configuration of the transmission apparatus 100 will be described below.

The engine 22 is supported by the vehicle body frame 21.

The engine 22 is a drive source of the tractor 1.

The engine 22 is a diesel engine but is not limited thereto, and may be a gasoline engine, for example.

The engine 22 is covered with the hood 23.

The drive wheels 24 include a right and left pair of front wheels 24*a* and a right and left pair of rear wheels 24*b*.

The right and left front wheels 24*a* are attached in a drivable and steerable manner to the vehicle body frame 21 via the front axle device 25.

The front axle device 25 transmits rotary power of the engine 22, which is transmitted via the transmission apparatus 100, to the right and left front wheels 24*a*.

The right and left rear wheels 24*b* are attached in a drivable manner to the vehicle body frame 21 via the transmission apparatus 100.

A system related to travel of the vehicle body 2 will be referred to as a travel system 2*a* of the vehicle body 2 (the tractor 1).

The travel system 2*a* includes the drive wheels 24, the front axle device 25, and the transmission apparatus 100.

The driving unit 26 is arranged in an upper portion of the vehicle body 2.

The driver's seat 26*a* is provided in the driving unit 26.

Plural steering members 26*b* are arranged around the driver's seat 26*a*.

The plural steering members 26*b* are configured to include a steering wheel, a pedal, levers, and the like.

The levers include a forward/reverse switching lever, a gear shift lever, and the like.

The driver's seat 26*a* is covered with a cabin 26*c*.

The tractor 1 is driven when the operator is seated on the driver's seat 26*a* and operates the plural steering members 26*b*.

The work machine 3 is attached to a hitch unit (not illustrated), which is located on a rear side of the vehicle body 2, via a support device 3*a*.

That is, the work machine 3 is arranged behind the vehicle body 2.

In detail, the work machine 3 is attached to the vehicle body 2 such that lifting and lowering thereof is allowed.

The work machine 3 is a tiller, for example, but may be a plow, a fertilizing device, an agricultural chemical sprayer, a harvester, a reaper, a snowplow, or the like in addition to the tiller.

1-2. Configuration of Transmission Apparatus

A description will be made on the configuration of the transmission apparatus 100 with reference to FIG. 2.

FIG. 2 is a schematic view illustrating the configuration of the transmission apparatus 100.

In FIG. 2, only one of the right and left rear wheels 24*b* is illustrated for convenience.

The transmission apparatus 100 transmits the rotary power of the engine 22, which is transmitted via a damper disc 22*a* (also referred to as a flywheel), to the right and left rear wheels 24*b*.

The damper disc 22*a* is provided to absorb rotational fluctuations of the engine 22 and prevent torsional vibration and the like.

The transmission apparatus 100 also transmits the rotary power of the engine 22 to the work machine 3 and the front axle device 25.

Hereinafter, the "rotary power" may simply be referred to as "power".

The transmission apparatus 100 is configured to include an HMT.

In detail, the transmission apparatus 100 includes an input-side power transmission mechanism 110, a hydrostatic continuously variable transmission mechanism 120, a planetary gear mechanism 130, an output-side power transmission mechanism 140, a differential mechanism 150, a front-wheel driving force takeoff unit 160, and a power take off (PTO) unit 170.

Here, the input-side power transmission mechanism 110, the hydrostatic continuously variable transmission mechanism 120, the planetary gear mechanism 130, the output-side power transmission mechanism 140, the differential mechanism 150, the front-wheel driving force takeoff unit 160, and the PTO unit 170 will collectively be referred to as a basic configuration 100*a* of the transmission apparatus 100.

In addition, hereinafter, the hydrostatic continuously variable transmission mechanism 120 may also be referred to as an HST 120.

The input-side power transmission mechanism 110 includes an input shaft 111, a first HST input gear 112, a first input gear 113, and a second input gear 114.

The input shaft 111 is coupled to the damper disc 22*a*.

Accordingly, the rotary power of the engine 22 is input to the input shaft 111 via the damper disc 22*a*.

The first HST input gear 112 is provided on the input shaft 111.

The first input gear 113 is rotatably provided on the input shaft 111 via a first input-side clutch mechanism 113*a*.

That is, the first input-side clutch mechanism 113*a* is included in the input-side power transmission mechanism 110.

The first input-side clutch mechanism 113*a* engages/disengages the input shaft 111 with/from the first input gear 113.

In detail, when the first input-side clutch mechanism 113*a* is brought into a disengaged state, the first input gear 113 becomes rotatable with respect to (is disengaged from) the input shaft 111.

On the other hand, when the first input-side clutch mechanism 113*a* is brought into an engaged state, the first input gear 113 is coupled to the input shaft 111 in a manner that relative rotation thereto is disallowed.

Switching between the disengaged state and the engaged state of the first input-side clutch mechanism 113*a* is performed on the basis of a command from a controller CU (see FIG. 3), which will be described below.

That is, the first input-side clutch mechanism 113*a* is configured by an electrically-controlled clutch mechanism.

Each clutch mechanism, which will be described below, has the same configuration.

The “engagement/disengagement” described above means engagement or disengagement between a driving-side member and a driven-side member.

The second input gear 114 is rotatably provided on the input shaft 111 via the second input-side clutch mechanism 114*a*.

The second input-side clutch mechanism 114*a* engages/disengages the input shaft 111 with/from the second input gear 114.

In detail, when the second input-side clutch mechanism 114*a* is brought into a disengaged state, the second input gear 114 becomes rotatable with respect to (is disengaged from) the input shaft 111.

On the other hand, when the second input-side clutch mechanism 114*a* is brought into an engaged state, the second input gear 114 is coupled to the input shaft 111 in a manner that relative rotation thereto is disallowed.

The first input-side clutch mechanism 113*a* and the second input-side clutch mechanism 114*a* are each configured to include a friction clutch (for example, a disc clutch), but are not limited thereto.

For example, each of the first input-side clutch mechanism 113*a* and the second input-side clutch mechanism 114*a* may be configured to include a meshing clutch (for example, a dog clutch).

The transmission apparatus 100 includes a plurality of rotational speed sensors RS.

The rotational speed sensors RS are arranged near the first HST input gear 112, near the first input gear 113, and near the second input gear 114.

The rotational speed sensor RS that is arranged near the first HST input gear 112 detects a rotational speed of the first HST input gear 112.

The rotational speed sensor RS that is arranged near the first input gear 113 detects a rotational speed of the first input gear 113.

The rotational speed sensor RS that is arranged near the second input gear 114 detects a rotational speed of the second input gear 114.

The HST 120 has an HST pump 121, an HST motor 122, and a tilt angle adjustment mechanism 123 in an integrated manner.

The HST pump 121 is configured by a piston pump.

A pump input shaft 121*a* of the HST pump 121 is provided with a second HST input gear 121*b* that meshes with the first HST input gear 112.

Accordingly, power of the input shaft 111 is input to the HST pump 121 via the first HST input gear 112 and the second HST input gear 121*b*.

The HST pump 121 is driven by this power (the rotary power of the engine 22) and discharges (pressure-feeds) hydraulic oil (pressure oil).

That is, the input-side power transmission mechanism 110, which includes the input shaft 111 and the first HST input gear 112, can transmit the rotary power of the engine 22 to the HST 120.

The HST pump 121 is particularly configured by a variable capacity piston pump.

In detail, the HST pump 121 has a tiltable swash plate 121*c*, and an amount (a discharge amount) of the hydraulic oil to be discharged varies by a tilt angle of this swash plate 121*c*.

The tilt angle of the swash plate 121*c* is adjusted by the tilt angle adjustment mechanism 123.

A configuration of the tilt angle adjustment mechanism 123 will be described below.

The HST motor 122 is configured by a fixed capacity piston motor.

The HST motor 122 is connected to the HST pump 121 via a flow path unit 124 that is formed in a closed circuit.

The flow path unit 124 is formed in a case (not illustrated) that accommodates the HST pump 121 and the HST motor 122.

In detail, the hydraulic oil that has been discharged by the HST pump 121 flows into the HST motor 122 through the flow path unit 124, and the HST motor 122 is then driven by this hydraulic oil.

In this way, a motor output shaft 122*a* of the HST motor 122 is driven.

That is, the HST 120 outputs the power.

An HST output gear 122*b* is provided at one end of the motor output shaft 122*a*.

Here, the HST motor 122, which includes the motor output shaft 122*a*, and the HST output gear 122*b* will collectively be referred to as an output unit 120*a* of the HST 120.

In addition, an output sensor OS is disposed near the output unit 120*a* of the HST 120, more specifically, the HST output gear 122*b*.

This output sensor OS detects a rotational speed of the HST output gear 122*b*, that is, output of the HST 120.

The output sensor OS only needs to be able to detect the output of the HST 120, and is not limited to have the configuration of detecting the rotational speed of the gear.

For example, the output sensor OS may be configured to include a torque sensor that detects the power of the HST 120 by detecting torque applied to the motor output shaft 122*a*.

The planetary gear mechanism 130 includes a ring gear 131, a planetary gear 132, a sun gear 133, and a carrier 134.

The ring gear 131 is formed in a ring shape and is formed with a meshing portion (teeth) on both an outer circumferential surface and an inner circumferential surface.

The meshing portion (external teeth) on the outer circumferential surface of the ring gear 131 meshes with the first input gear 113 that is provided on the input shaft 111.

Accordingly, when the first input-side clutch mechanism 113*a* is in the engaged state, the power of the input shaft 111 (that is, the rotary power of the engine 22) is input to the ring gear 131 via the first input gear 113.

That is, the first input-side clutch mechanism 113*a* engages/disengages the engine 22 with/from the planetary gear mechanism 130.

The meshing portion (internal teeth) on the inner circumferential surface of the ring gear 131 meshes with the planetary gear 132.

The planetary gear 132 also meshes with the sun gear 133.

In detail, the sun gear 133 is arranged in a freely rotatable manner about an axis on the same line as a rotation axis of the ring gear 131.

The planetary gear 132 is arranged in a manner to be able to freely revolve around the sun gear 133 and is supported by the carrier 134 in a manner to be freely rotatable (rotatable on its axis).

The carrier 134 is arranged in a freely rotatable manner about an axis on the same line as a rotation axis of the sun gear 133 and rotates in conjunction with the revolution of the planetary gear 132 around the sun gear 133.

In the present embodiment, the plural (two in FIG. 2) planetary gears 132 are provided, but the number of the planetary gears 132 is not limited thereto.

For example, the number of the planetary gears 132 may be one, three, or more.

A carrier input/output shaft 134*a* is coupled to the carrier 134.

The carrier input/output shaft 134*a* is provided with a carrier input/output gear 134*b*.

The carrier input/output gear 134*b* meshes with the second input gear 114 that is provided on the input shaft 111.

Accordingly, when the second input-side clutch mechanism 114*a* is in the engaged state, the power of the input shaft 111 (that is, the rotary power of the engine 22) is input to the carrier 134 via the second input gear 114, the carrier input/output gear 134*b*, and the carrier input/output shaft 134*a*.

That is, the rotary power of the engine 22 is input to the planetary gear mechanism 130 by the input-side power transmission mechanism 110.

In other words, the input-side power transmission mechanism 110 can transmit the rotary power of the engine 22 to the planetary gear mechanism 130.

In addition, the sun gear 133 meshes with the HST output gear 122*b*.

Accordingly, the power of the HST 120 is input to the sun gear 133 via the HST output gear 122*b*.

That is, the rotary power of the engine 22 and the rotary power of the HST 120 are input to two of the three elements (the sun gear 133, the carrier 134 (the planetary gear 132), and the ring gear 131) of the planetary gear mechanism 130.

The output-side power transmission mechanism 140 can transmit the rotary power, which is output from the planetary gear mechanism 130, to the drive wheels 24.

In detail, the output-side power transmission mechanism 140 includes a first output gear 141, a second output gear 142, and a first composition output shaft 143.

The first output gear 141 is rotatably provided on the first composition output shaft 143 via a first output-side clutch mechanism 141*a*.

The first output-side clutch mechanism 141*a* engages/disengages the first output gear 141 with/from the first composition output shaft 143.

In detail, when the first output-side clutch mechanism 141*a* is brought into the disengaged state, the first output gear 141 becomes rotatable relative to (is disengaged from) the first composition output shaft 143.

On the other hand, when the first output-side clutch mechanism 141*a* is brought into the engaged state, the first output gear 141 becomes unable to rotate relative to (is engaged with) the first composition output shaft 143.

The second output gear 142 is rotatably provided on the first composition output shaft 143 via a second output-side clutch mechanism 142*a*.

The second output-side clutch mechanism 142*a* engages/disengages the second output gear 142 with/from the first composition output shaft 143.

In detail, when the second output-side clutch mechanism 142*a* is brought into the disengaged state, the second output gear 142 becomes rotatable relative to (is disengaged from) the first composition output shaft 143.

On the other hand, when the second output-side clutch mechanism 142*a* is brought into the engaged state, the second output gear 142 becomes unable to rotate relative to (is engaged with) the first composition output shaft 143.

The first output-side clutch mechanism 141*a* and the second output-side clutch mechanism 142*a* are each configured to include a friction clutch, but are not limited thereto.

For example, each of the first output-side clutch mechanism 141*a* and the second output-side clutch mechanism 142*a* may be configured to include a meshing clutch.

First, a description will hereinafter be made on a first power composition state. The second output gear 142 is engaged with the carrier input/output gear 134*b*. Accordingly, when the second output-side clutch mechanism 142*a* is in the engaged state, the power of the carrier 134 is input to the first composition output shaft 143 via the second output gear 142.

The first input-side clutch mechanism 113*a* and the second output-side clutch mechanism 142*a* are brought into the engaged state, and the second input-side clutch mechanism 114*a* and the first output-side clutch mechanism 141*a* are brought into the disengaged state.

Then, the power of the input shaft 111 (the rotary power of the engine 22) is transmitted to the planetary gear 132 via the first input gear 113 and the ring gear 131.

In addition, the power of the HST 120 is transmitted to the planetary gear 132 via the HST output gear 122*b* and the sun gear 133.

Consequently, the planetary gear 132 rotates while revolving around the sun gear 133.

As a result, the carrier 134 that supports the planetary gear 132 rotates, and the carrier 134 outputs the power.

The power (resultant power) that is output from the carrier 134 is transmitted to the first composition output shaft 143 via the carrier input/output shaft 134*a*, the carrier input/output gear 134*b*, and the second output gear 142.

Next, a description will hereinafter be made on a second power composition state. The first output gear 141 meshes with the external teeth of the ring gear 131.

Accordingly, when the first output-side clutch mechanism 141*a* is in the engaged state, the power of the ring gear 131 is input to the first composition output shaft 143 via the first output gear 141.

The second input-side clutch mechanism 114*a* and the first output-side clutch mechanism 141*a* are brought into the engaged state, and the first input-side clutch mechanism 113*a* and the second output-side clutch mechanism 142*a* are brought into the disengaged state.

Consequently, the power of the input shaft 111 (the rotary power of the engine 22) is transmitted to the carrier 134 via the second input gear 114, the carrier input/output gear 134*b*, and the carrier input/output shaft 134*a*.

When the power is input to the carrier 134, the carrier 134 rotates about an axis on the same line as the rotation axis of the sun gear 133.

When the carrier 134 rotates, the planetary gear 132 revolves around the sun gear 133.

Meanwhile, as described above, the power of the HST 120 is input to the sun gear 133 that meshes with the planetary gear 132.

Thus, the planetary gear 132 rotates while revolving around the sun gear 133. As a result, the ring gear 131 that meshes with the planetary gear 132 rotates, and the ring gear 131 then outputs the power.

The power (the resultant power) that is output from the ring gear 131 is transmitted to the first composition output shaft 143 via the first output gear 141.

That is, the input-side clutch mechanisms 113*a*, 114*a*, the output-side clutch mechanisms 141*a*, 142*a*, and the planetary gear mechanism 130 combine the rotary power of the engine 22 and the power that is output from the HST 120, and output the resultant power.

The output-side power transmission mechanism 140 further has a first forward gear train 144, a second forward gear train 145, a third forward gear train 146, a reverse gear train 147, and a second composition output shaft 148.

Each of the first forward gear train 144, the second forward gear train 145, the third forward gear train 146, and the reverse gear train 147 is configured to include plural gears.

The first forward gear train 144, the second forward gear train 145, and the third forward gear train 146 have mutually different reduction ratios.

The reduction ratio means a ratio of the rotational speed of the output-side power to the rotational speed of the input-side power.

The second composition output shaft 148 is coupled to the first composition output shaft 143 via the first forward gear train 144, the second forward gear train 145, the third forward gear train 146, and the reverse gear train 147.

In detail, the first forward gear train 144 is directly coupled to the first composition output shaft 143, and is coupled to the second composition output shaft 148 via a first forward clutch mechanism 144*a*.

The first forward clutch mechanism 144*a* engages/disengages the first forward gear train 144 with/from the second composition output shaft 148.

Accordingly, when the first forward clutch mechanism 144*a* is in the engaged state, the power of the first composition output shaft 143 is input to the second composition output shaft 148 via the first forward gear train 144.

The second forward gear train 145 and the third forward gear train 146 are coupled to the first composition output shaft 143 via a selection clutch mechanism 145*a*.

The selection clutch mechanism 145*a* engages/disengages the second forward gear train 145 with/from the first composition output shaft 143, and engages/disengages the third forward gear train 146 with/from the first composition output shaft 143.

That is, the first composition output shaft 143 is engaged with one of the second forward gear train 145 and the third forward gear train 146 by the selection clutch mechanism 145*a*.

The rotational speed sensor RS is arranged near a gear, which is coupled to the first composition output shaft 143, of gears included in the second forward gear train 145.

The second forward gear train 145 and the third forward gear train 146 are coupled to the second composition output shaft 148 via a second forward clutch mechanism 145*b*.

The second forward clutch mechanism 145*b* engages/disengages each of the second forward gear train 145 and the third forward gear train 146 with/from the second composition output shaft 148.

Accordingly, when the second forward gear train 145 and the first composition output shaft 143 are engaged by the selection clutch mechanism 145*a*, and the second forward clutch mechanism 145*b* is in the engaged state, the power of the first composition output shaft 143 is input to the second composition output shaft 148 via the second forward gear train 145.

Meanwhile, when the third forward gear train 146 and the first composition output shaft 143 are engaged by the selection clutch mechanism 145*a*, and the second forward clutch mechanism 145*b* is in the engaged state, the power of the first composition output shaft 143 is input to the second composition output shaft 148 via the third forward gear train 146.

The reverse gear train 147 is directly coupled to the first composition output shaft 143, and is coupled to the second composition output shaft 148 via a reverse clutch mechanism 147*a*.

The reverse clutch mechanism 147*a* engages/disengages the reverse gear train 147 with/from the second composition output shaft 148.

Accordingly, when the reverse clutch mechanism 147*a* is in the engaged state, the power of the first composition output shaft 143 is input to the second composition output shaft 148 via the reverse gear train 147.

In the power transmission via the reverse gear train 147, a rotational direction of the second composition output shaft 148 is an opposite direction to that in the power transmission via any one of the first forward gear train 144, the second forward gear train 145, and the third forward gear train 146.

Each of the first forward clutch mechanism 144*a*, the second forward clutch mechanism 145*b*, and the reverse clutch mechanism 147*a* is configured to include a friction clutch, but is not limited thereto.

For example, each of the first forward clutch mechanism 144*a*, the second forward clutch mechanism 145*b*, and the reverse clutch mechanism 147*a* may be configured to include a meshing clutch.

In addition, the selection clutch mechanism 145*a* is configured to include a meshing clutch, but is not limited thereto.

For example, the selection clutch mechanism 145*a* may be configured to include a friction clutch.

One end of the second composition output shaft 148 is coupled to the differential mechanism 150.

The differential mechanism 150 transmits the power of the second composition output shaft 148 to the right and left rear wheels 24*b*.

In detail, the power that is transmitted from the differential mechanism 150 is transmitted via a brake device 24*b*1, which is provided on each of the right and left rear wheels 24*b*, and a drive shaft 24*b*2.

The other end of the second composition output shaft 148 is coupled to the front-wheel driving force takeoff unit 160.

The front-wheel driving force takeoff unit 160 takes off the driving force for driving the front wheels 24*a* (see FIG. 1) from the second composition output shaft 148.

Accordingly, an output side of the front-wheel driving force takeoff unit 160 is coupled to the front axle device 25 via a propeller shaft 25*a*.

In addition, the rotational speed sensor RS is arranged in the front-wheel driving force takeoff unit 160.

This rotational speed sensor RS is arranged near a gear, which rotates in conjunction with the second composition output shaft 148, of gears included in the front-wheel driving force takeoff unit 160, and detects a rotational speed of this gear.

The PTO power unit 170 includes a PTO output shaft 171 and a PTO gear train 172.

The PTO output shaft 171 is coupled to the input shaft 111 via a PTO clutch mechanism 171*a*.

In addition, the PTO output shaft 171 is provided in a manner that coupling thereof to the work machine 3 (see FIG. 1) is allowed.

The PTO clutch mechanism 171*a* is configured to include a friction clutch, but is not limited thereto.

For example, the PTO clutch mechanism 171*a* may be configured to include a meshing clutch.

Accordingly, when the PTO output shaft 171 is coupled to the work machine 3, and the PTO clutch mechanism 171*a* is in the engaged state, the power of the PTO shaft 171 is transmitted to the work machine 3.

The work machine 3 is driven by this power.

The PTO gear train 172 includes a plurality of gears.

The PTO gear train 172 is directly coupled to the input shaft 111 and is coupled to a hydraulic pump HP.

Accordingly, the power of the input shaft 111 is transmitted to the hydraulic pump HP via the PTO gear train 172, and the hydraulic pump HP is thereby driven by this power.

The hydraulic pump HP supplies the hydraulic oil to, for example, an actuator (not illustrated) for lifting/lowering the work machine 3 and the tilt angle adjustment mechanism 123.

Here, a description will be made on the configuration of the tilt angle adjustment mechanism 123 with reference to FIG. 3.

Figure 3:
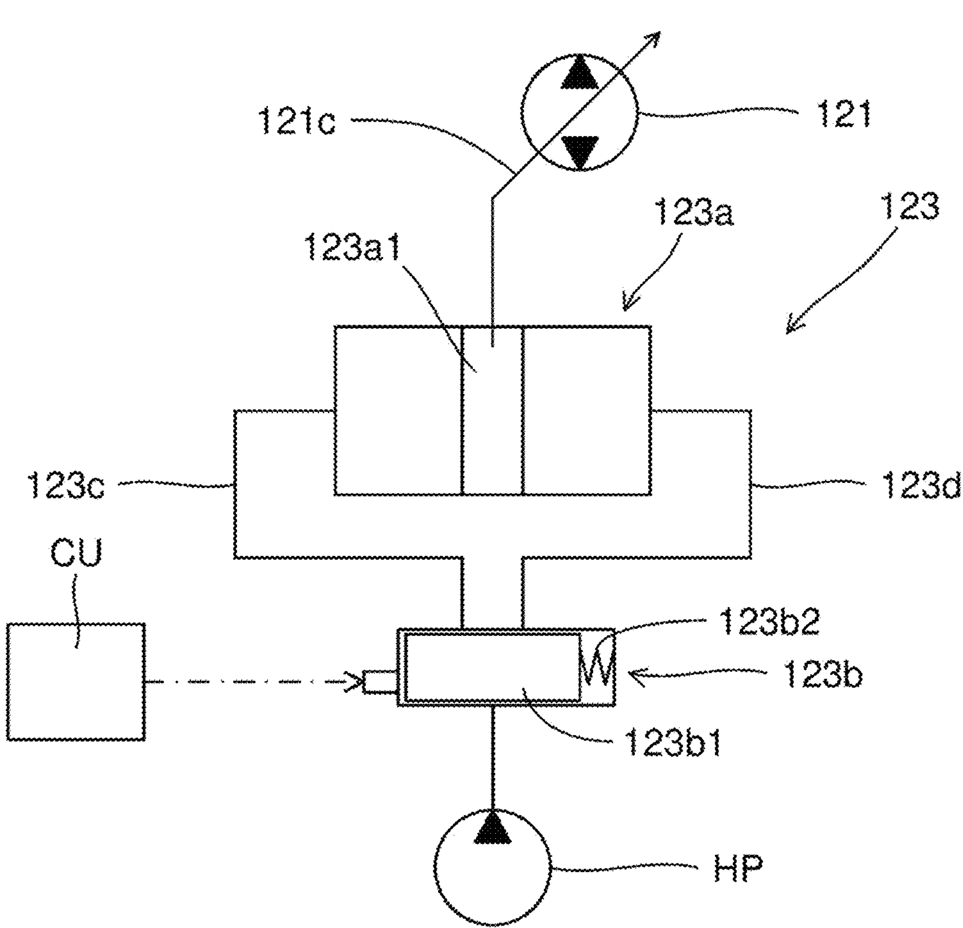
FIG. 3 is a schematic view illustrating a configuration of a tilt angle adjustment mechanism.

FIG. 3 is a schematic view illustrating the configuration of the tilt angle adjustment mechanism 123.

The tilt angle adjustment mechanism 123 includes a cylinder 123*a* and an electromagnetic proportional valve 123*b*.

The cylinder 123*a* accommodates a piston 123*al*.

The piston 123*al* is provided to be able to reciprocate in the cylinder 123*a*.

In detail, the piston 123*al* moves according to the hydraulic oil that is supplied from the hydraulic pump HP to the cylinder 123*a* via the electromagnetic proportional valve 123*b*.

For example, when the hydraulic oil is supplied to the cylinder 123*a* through a first oil path 123*c*, and the hydraulic oil is discharged to a hydraulic oil tank (not illustrated) through a second oil path 123*d*, the piston 123*al* moves to one side (a right side in FIG. 3).

On the contrary, when the hydraulic oil is supplied to the cylinder 123*a* through the second oil path 123*d*, and the hydraulic oil is discharged to the hydraulic oil tank through the first oil path 123*c*, the piston 123*al* moves to the other side (a left side in FIG. 3).

The electromagnetic proportional valve 123*b* switches a destination to supply the hydraulic oil from the hydraulic pump HP between the first oil path 123*c* and the second oil path 123*d* on the basis of energization (the command) from the controller CU.

The controller CU is configured by an electronic control unit, which is also referred to as an ECU, and electrically controls each unit of the tractor 1.

That is, the HST 120 (in particular, the tilt angle adjustment mechanism 123) is configured to be of an electrically controlled type.

The controller CU is arranged in the vehicle body 2, but it is included in the transmission device 100. In other words, the transmission device 100 is equipped with the controller CU.

The controller CU receives operation signals from the forward/reverse switching lever (not illustrated) and the gear shift lever (not illustrated) via a position sensor (not illustrated).

By operating the gear shift lever, the vehicle can travel at any vehicle speed from a stop to a maximum speed. In an operation range of the gear shift lever, one end side is set as a neutral position (a vehicle stop), and the other end side is set as a maximum speed position.

In detail, a spool 123*b*1 and a spring 123*b*2 that urges the spool 123*b*1 are installed in the electromagnetic proportional valve 123*b*.

When the controller CU receives the operation signal of the gear shift lever, the electromagnetic proportional valve 123*b* is energized, and the spool 123*b*1 moves against an urging force of the spring 123*b*2. An energization amount thereof varies according to an operation amount of the gear shift lever. Depending on a position of the spool 123*b*1 that has moved, the oil path from the hydraulic pump HP communicates with the first oil path 123*c*, or the oil path from the hydraulic pump HP communicates with the second oil path 123*d*. Accordingly, a supply amount of the hydraulic oil to the cylinder 123*a* can be adjusted by the controller CU and the electromagnetic proportional valve 123*b* according to the operation amount of the gear shift lever (not illustrated), and the position of the piston 123*al* in the cylinder 123*a* can be adjusted steplessly within a range where the piston 123*al* can reciprocate. In this way, it is possible to increase/reduce the output of the HST motor 122.

Here, in a state where the energization from the controller CU to the electromagnetic proportional valve 123*b* is cut off (a non-energized state), the spool 123*b*1 moves to a predetermined position by the urging force of the spring 123*b*2.

At this position, for example, the oil path from the hydraulic pump HP communicates with the first oil path 123*c*.

That is, in a non-energized state of the electromagnetic proportional valve 123*b*, the piston 123*al* moves to the end on the one side (the right side in FIG. 3) in the cylinder 123*a*.

However, it may be configured that the oil path from the hydraulic pump HP communicates with the second oil path 123*d* when the electromagnetic proportional valve 123*b* is in the non-energized state.

In this case, the piston 123*al* moves to the end on the other side (the left side in FIG. 3) in the cylinder 123*a*.

In addition, the piston 123*al* is coupled to the swash plate 121*c* of the HST pump 121 and adjusts the tilt angle of the swash plate 121*c*.

In detail, the tilt angle of the swash plate 121*c* varies according to the position of the piston 123*al* in the cylinder 123*a*.

As described above, since the position of the piston 123*al* can be adjusted steplessly in the right direction or the left direction with a central position in a longitudinal direction (the neutral position) in the cylinder 123*a*, which is illustrated, being a reference, the tilt angle of the swash plate 121*c* can be adjusted steplessly to a maximum angle in one direction or to a maximum angle in the other direction of a tilt direction across the neutral position. Furthermore, as described above, the discharge amount of the HST pump 121 varies according to the tilt angle of the swash plate 121*c*. Thus, when the tilt angle of the swash plate 121*c* is adjusted steplessly, the discharge amount of the HST pump 121 can also be adjusted steplessly from zero.

In this way, the output of the HST motor 122, that is, a rotational speed of the motor output shaft 122*a* can vary steplessly from zero. When the tilt direction of the swash plate 121*c* is reversed from the one direction to the other direction, the rotational direction of the motor output shaft 122*a* is changed.

That is, the HST 120 changes the rotary power of the engine 22, which has been input to the HST pump 121, steplessly and can thereby output the changed rotary power as the output of the HST motor 122.

As described above, when the electromagnetic proportional valve 123*b* is brought into the non-energized state, the piston 123*al* receives the urging force of the spring 123*b*2 and moves to the end on the one side (or the other side) in the cylinder 123*a*.

Accordingly, the tilt angle of the swash plate 121*c* in this state is a maximum tilt angle in the one direction.

That is, the tilt angle adjustment mechanism 123 tilts the swash plate 121*c* to the maximum tilt angle in the one direction in the non-energized state.

In addition, as described above, the discharge amount of the HST pump 121 varies according to the tilt angle of the swash plate 121*c* that is controlled in response to the operation of the gear shift lever. In the case where the tilt angle of the swash plate 121*c* is zero, the HST pump 121 stops discharging the hydraulic oil even when being driven by the engine 22.

When the gear shift lever is at the neutral position, the controller CU, which has detected the position, adjusts the position of the piston 123*al* such that the swash plate 121*c* is tilted at a predetermined tilt angle (for example, about 90% when the maximum tilt angle is set to 100%) in the one direction. When the swash plate 121*c* is set at the predetermined angle, the HST pump 121 discharges a predetermined amount of the hydraulic oil. The HST 120 outputs a predetermined amount of the power when receiving this hydraulic oil. Each of gear ratios of the input-side power transmission mechanism 110, the planetary gear mechanism 130, and the output-side power transmission mechanism 140 is set such that the rotation of the first composition output shaft 143 is stopped when the predetermined rotary power from this HST 120 and the rotary power from the engine 22 are combined in the first power composition state. That is, the controller CU controls the swash plate 121*c* at the predetermined tilt angle, and the vehicle body 2 can thereby be stopped without cutting off the power (powered neutral).

Accordingly, at least when the swash plate 121*c* is tilted at the maximum tilt angle, the HST pump 121 discharges an amount of the hydraulic oil that is equal to or larger than the amount that is determined at the predetermined tilt angle.

That is, the HST 120 outputs the power even when the tilt angle adjustment mechanism 123 is at least in the non-energized state, that is, in an uncontrolled state. In the first power composition state, such output becomes the power that rotationally drives the first composition output shaft 143.

1-3. Power Transmission by Transmission Apparatus

1-3-1. Power Transmission when Transmission Apparatus is Normal

A description will be made on control of each of the clutch mechanisms that are particularly related to the power transmission from the engine 22 to the rear wheels 24*b* when the transmission apparatus 100 is normal.

As illustrated in FIG. 2, for example, the gear shift lever (not illustrated), which is included in the plural steering members 26*b* (see FIG. 1) arranged in the driving unit 26, is configured to be able to set any vehicle speed from the vehicle stop to the maximum speed. The one end side of the operation range of the gear shift lever is set as the neutral position (the vehicle stop), and the other end side thereof is set as the maximum speed travel position. A power switching point is set in the middle of the entire operation range.

When the gear shift lever is operated from the neutral position to the power switching point, the controller CU causes the swash plate 121*c* to move from the predetermined tilt angle (for example, about 90% when the maximum tilt angle is set to 100%) in the one direction described above to the maximum tilt angle in the other direction, and brings each of the above clutch mechanisms into the following state.

More specifically, the first input-side clutch mechanism 113*a* and the second output-side clutch mechanism 142*a* are engaged, and the second input-side clutch mechanism 114*a* and the first output-side clutch mechanism 141*a* are disengaged. As a result, the first power composition state is established. When the gear shift lever is operated to a position between the power switching point and the maximum speed position, the controller CU causes the swash plate 121*c* to move from the maximum tilt angle in the other direction to the maximum tilt angle in the one direction, and brings each of the above clutch mechanisms into the following state.

More specifically, the second input-side clutch mechanism 114*a* and the first output-side clutch mechanism 141*a* are engaged, and the first input-side clutch mechanism 113*a* and the second output-side clutch mechanism 142*a* are disengaged. As a result, the second power composition state is established. Each of the gear ratios of the input-side power transmission mechanism 110, the planetary gear mechanism 130, and the output-side power transmission mechanism 140 is set such that, when the gear shift lever is at the power switching point, that is, when the swash plate 121*c* has the maximum tilt angle in the other direction, an output rotational speed of the first composition output shaft 143 in the second power composition state substantially matches the output rotational speed of the first composition output shaft 143 in the first power composition state. A switching shock that occurs when the gear shift lever passes the power switching point can be reduced by this gear ratio setting and by adopting a friction clutch mechanism for each of the clutch mechanisms as will be described below.

The forward/reverse switching lever (not illustrated) described above is configured to be selectively operated to any one of a first forward position, a second forward position, and a reverse position. By detecting the lever position, the controller CU engages any one of the corresponding first forward clutch mechanism 144*a*, second forward clutch mechanism 145*b*, and reverse clutch mechanism 147*a*, and disengages the others.

When the second forward clutch mechanism 145*b* is engaged, one of the second forward gear train 145 and the third forward gear train 146 is engaged with the first composition output shaft 143 in advance by the selection clutch mechanism 145*a*.

When the tractor 1 travels forward, the forward/reverse switching lever is set to the first forward position, and the gear shift lever is shifted from the neutral position to a gear shift position. Then, the power of the engine and the power of the HST are output to the first composition output shaft 143 through the first power composition state (further, the second power composition state). Next, the first forward gear train 144 drives the second composition output shaft 148 via the engaged first forward clutch mechanism 144*a*.

Accordingly, the power is transmitted from the engine 22 to the rear wheel 24*b*, and the rear wheel 24*b* is driven in a forward travel direction (a counterclockwise direction when the tractor 1 is viewed from the left side) (see FIG. 1).

As a result, the tractor 1 can travel forward.

When the tractor 1 travels reversely, the forward/reverse switching lever is shifted to the reverse position. In this way, the reverse gear train 147 drives the second composition output shaft 148 via the engaged reverse clutch mechanism 147*a*.

Accordingly, the power is transmitted from the engine 22 to the rear wheel 24*b*, and the rear wheel 24*b* is driven in a reverse travel direction (a clockwise direction when the tractor 1 is viewed from the left side).

As a result, the tractor 1 can travel forward.

1-3-2. Power Transmission when Transmission Apparatus is Abnormal

Next, a description will be made on the power transmission of the transmission apparatus 100 for transmitting the rotary power of the engine 22 to the drive wheels 24 even when abnormality occurs to the transmission apparatus 100 (in particular, the HST 120).

In the following description, the above the power transmission will also be referred to as preliminary control, and, in particular, the preliminary control in the first embodiment will be referred to as first preliminary control.

A description will be made on a flow of the first preliminary control with reference to FIG. 4.

Figure 4:
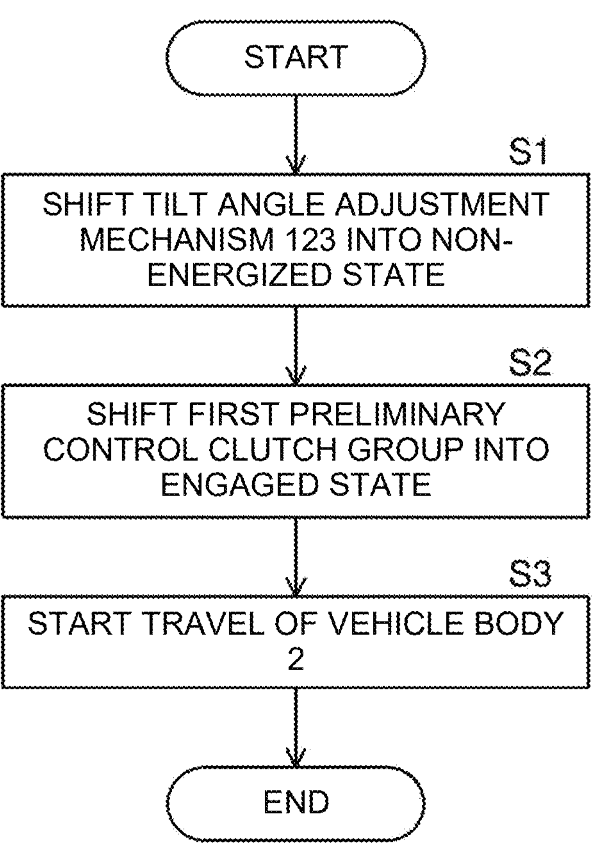
FIG. 4 is a flowchart illustrating a flow of first preliminary control.

FIG. 4 is a flowchart illustrating the flow of the first preliminary control.

A time when the flowchart illustrated in FIG. 4 is started (a time when the first preliminary control is executed) will be described below.

In step S1, the controller CU (see FIG. 3) cuts off the energization of the tilt angle adjustment mechanism 123 (more specifically, the electromagnetic proportional valve 123*b*) that is included in the HST 120, and shifts the tilt angle adjustment mechanism 123 into the non-energized state.

That is, the first preliminary control includes bringing the HST 120 into the uncontrolled state (disabling the gear shift operation).

In detail, bringing the HST 120 into the uncontrolled state (disabling the gear shift operation) includes bringing the tilt angle adjustment mechanism 123 into the non-energized state.

As described above, when the tilt angle adjustment mechanism 123 is brought into the non-energized state, the swash plate 121*c* of the HST pump 121 is tilted to the maximum tilt angle.

When the swash plate 121*c* is tilted at the maximum tilt angle, the HST pump 121 discharges a maximum amount of the hydraulic oil.

Consequently, the HST motor 122 is driven by receiving this hydraulic oil, and the HST 120 outputs the rotary power. The power that is output from this HST 120 is input to the planetary gear mechanism 130 (in particular, the sun gear 133).

After the tilt angle adjustment mechanism 123 is brought into the non-energized state, the processing proceeds to next step S2.

In step S2, the controller CU shifts a first preliminary control clutch group into the engaged state.

The first preliminary control clutch group includes the first input-side clutch mechanism 113*a*, the second output-side clutch mechanism 142*a*, and the second forward clutch mechanism 145*b*.

In this case, since the first input-side clutch mechanism 113*a* is in the engaged state, the power of the input shaft 111 (the rotary power of the engine 22) is input to the planetary gear mechanism 130 (in particular, the ring gear 131). That is, the rotary power of the engine 22 is transmitted to the planetary gear mechanism 130 via the input-side power transmission mechanism 110.

Thus, the planetary gear mechanism 130 combines the rotary power of the engine 22 and the rotary power of the HST 120, and drives the carrier input/output shaft 134*a* by the carrier 134.

In addition, since the second output-side clutch mechanism 142*a* and the second forward clutch mechanism 145*b* are in the engaged state, the power of the planetary gear mechanism 130 (in particular, the carrier 134) is input to the right and left rear wheels 24*b*.

In detail, the power of the planetary gear mechanism 130 is transmitted to the rear wheels 24*b* via the output-side power transmission mechanism 140, the differential mechanism 150, the brake device 24*b*1, and the drive shaft 24*b*2. As a result, the rear wheels 24*b* are driven, and the vehicle body 2 (the tractor 1) starts traveling forward although the gear thereof cannot be changed (step S3).

Here, the first preliminary control clutch group may include the second input-side clutch mechanism 114*a* and the first output-side clutch mechanism 141*a* instead of the first input-side clutch mechanism 113*a* and the second output-side clutch mechanism 142*a*.

Alternatively, the first preliminary control clutch group may include the first forward clutch mechanism 144*a* or may include the reverse clutch mechanism 147*a* instead of the second forward clutch mechanism 145*b*. When the reverse clutch mechanism 147*a* is included, the travel during the abnormality is in the reverse direction.

Next, a description will be made on a flow at the time when the first preliminary control is executed.

First, a description will be made on a flow at the time when an execution determination of the first preliminary control (a determination on whether the first preliminary control can be executed) is started with reference to FIG. 5.

Figure 5:
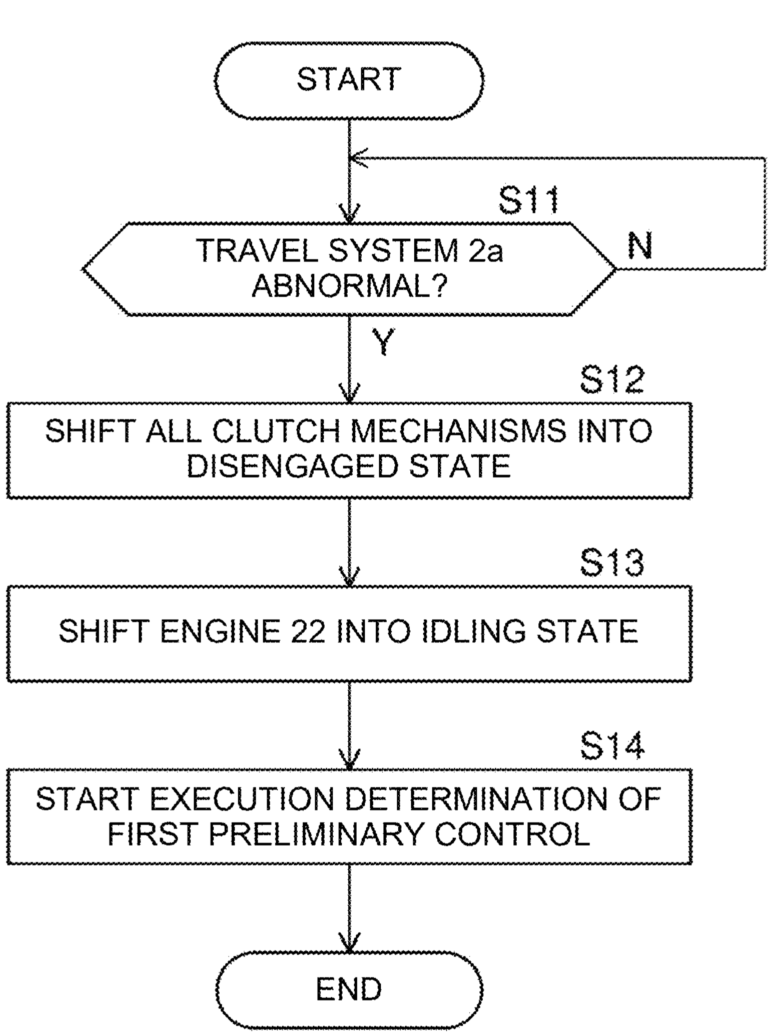
FIG. 5 is a flowchart illustrating a flow at the time when an execution determination of the first preliminary control is started.

FIG. 5 is a flowchart illustrating a flow at the time when the execution determination of the first preliminary control is started. The flowchart illustrated in FIG. 5 is started at timing at which the engine 22 is started, for example.

In step S11, the controller CU (see FIG. 3) determines whether the travel system 2*a* (see FIG. 1) is abnormal. The abnormality of the travel system 2*a* is determined on the basis of detection information that is output from plural types of the sensors provided in the travel system 2*a*.

The plural types of the sensors include the rotational speed sensor RS and the output sensor OS described above (see FIG. 2).

If the travel system 2*a* is abnormal (Yes in step S11), the processing proceeds to next step S12. If the travel system 2*a* is not abnormal (No in step S11), the controller CU continues the determination of the abnormality of the travel system 2*a*.

Here, in the case where the travel system 2*a* is abnormal, the operator may be notified that the travel system 2*a* is abnormal via a display unit (not illustrated) that is provided in the driving unit 26 (see FIG. 1).

In step S12, the controller CU shifts all the clutch mechanisms (for example, the first input-side clutch mechanism 113*a*, the second input-side clutch mechanism 114*a*, and the like), which are provided in the transmission apparatus 100, into the disengaged state.

After all the clutch mechanisms are brought into the disengaged state, the processing proceeds to next step S13.

In step S13, the controller CU shifts the engine 22 into an idling state. That is, a speed of the engine 22 is set to an idling speed.

When the engine 22 is brought into the idling state, the controller CU starts the execution determination of the first preliminary control of the transmission apparatus 100 (step S14).

Next, a description will be made on a flow of the execution determination of the first preliminary control with reference to FIG. 6. FIG. 6 is a flowchart illustrating the flow of the execution determination of the first preliminary control.

In step S21, the controller CU determines whether at least the first preliminary control clutch group is operable.

That is, it is determined whether at least the first input-side clutch mechanism 113*a*, the second output-side clutch mechanism 142*a*, and the second forward clutch mechanism 145*b* are operable. This determination is made on the basis of the detection information (the rotation speed of the gear) that is output from the rotational speed sensor RS disposed in the transmission apparatus 100.

If at least the first preliminary control clutch group is operable (Yes in step S21), the processing proceeds to next step S22.

If at least one in the first preliminary control clutch group is inoperable (No in step S21), the controller CU determines that the abnormality of the travel system 2*a* is abnormality of the clutch mechanism that is included in the transmission apparatus 100 (step S23).

Based on this determination, the operator may be notified that the transmission apparatus 100 (in particular, the clutch mechanism) is abnormal via the display unit described above.

In step S22, the controller CU determines whether the HST 120 can output. This determination is made on the basis of the detection information (the rotational speed of the HST output gear 122*b*) that is output from the output sensor OS.

If the HST 120 can output (Yes in step S22), the processing proceeds to next step S24.

If the HST 120 is unable to output (No in step S22), the controller CU determines that the abnormality of the travel system 2*a* is abnormality of at least one of the HST pump 121 and the HST motor 122 (step S25).

Based on this determination, the operator may be notified that the transmission apparatus 100 (in particular, the HST 120) is abnormal via the display unit described above.

In step S24, the controller CU determines whether the output of the HST 120 can be adjusted.

In detail, the controller CU energizes (commands) the tilt angle adjustment mechanism 123 of the HST 120 to change the output and, based on this energization, determines whether the output of the HST 120 (in particular, the motor output shaft 122*a* of the HST motor 122) is changed.

Similar to the determination in step S22, this determination is made on the basis of the detection information that is output from the output sensor OS. That is, the abnormality determination of the HST 120 (the determination on whether outputting is possible, the determination on whether the output can be adjusted) is made on the basis of the detection information by the output sensor OS.

If the output of the HST 120 can be adjusted (Yes in step S24), the controller CU determines that the transmission apparatus 100 is normal, and the execution of the first preliminary control is unnecessary (step S26).

For example, if the output of the HST 120 cannot be adjusted due to failure of the position sensor (not illustrated) for the gear shift lever (not illustrated) (No in step S24), the controller CU determines that the abnormality of the travel system 2*a* is abnormality (uncontrollability) of the tilt angle adjustment mechanism 123 (step S27), and executes the first preliminary control (step S28). That is, in the case where the HST 120, in particular, the tilt angle adjustment mechanism 123 is abnormal, the first preliminary control is executed.

According to the above the power transmission (first preliminary control in the first embodiment), even when the abnormality occurs to the HST 120 (the abnormality in the output adjustment of the HST 120 in the first embodiment), the HST 120 can output the rotary power of the engine 22.

Then, the planetary gear mechanism 130 can combine the rotary power that is output from the HST 120 and the rotary power of the engine 22 and output the resultant power to the drive wheels 24 (the right and left rear wheels 24*b* in the present embodiment). As a result, the drive wheels 24 are driven, and the tractor 1 can travel although the gear thereof cannot be changed.

In addition, the above the power transmission (first preliminary control in the first embodiment) is configured by the simple method of effectively using the HST 120, which has already been provided in the transmission apparatus 100, and cutting off the energization to the HST 120.

Therefore, there is no need to change the basic configuration 100*a* of the transmission apparatus 100, and the basic configuration 100*a* can be maintained. As it has been described so far, the transmission apparatus 100 can transmit the power even when the HST 120 becomes abnormal, while the basic configuration 100*a* of the transmission apparatus 100 is maintained.

The following configuration is desirable from a viewpoint of avoiding such a situation where the power transmission from the engine 22 to the drive wheel 24 by the transmission apparatus 100 is stopped due to the abnormality in the output adjustment of the HST 120.

More specifically, as illustrated in FIG. 6, when the output of the HST 120 cannot be adjusted, the above the power transmission (first preliminary control in the first embodiment) is desirably executed.

The following configuration is desired in order to reliably transmit the power from the engine 22 to the drive wheels 24 in the configuration that the tilt angle adjustment mechanism 123 tilts the swash plate 121*c* of the HST pump 121 to the maximum tilt angle in the non-energized state and that the HST pump 121 discharges the hydraulic oil at least at this time.

More specifically, as illustrated in FIG. 4, in the above the power transmission (first preliminary control in the first embodiment), bringing the HST 120 into the non-energized state desirably includes bringing the tilt angle adjustment mechanism 123 into the non-energized state.

The following configuration is desirable from a viewpoint of avoiding such a situation where the power transmission from the engine 22 to the drive wheel 24 by the transmission apparatus 100 is stopped due to the abnormality in the control of the tilt angle adjustment mechanism 123.

More specifically, as illustrated in FIG. 6, when the tilt angle adjustment mechanism 123 is uncontrollable, the above the power transmission (first preliminary control in the first embodiment) is desirably executed.

Second Embodiment

2-1. Configuration of Transmission Apparatus

Next, a description will be made on a configuration of a transmission apparatus 100 according to a second embodiment of the present invention.

First, a description will be made on the configuration of the transmission apparatus 100 in the second embodiment with reference to FIG. 7.

Figure 7:
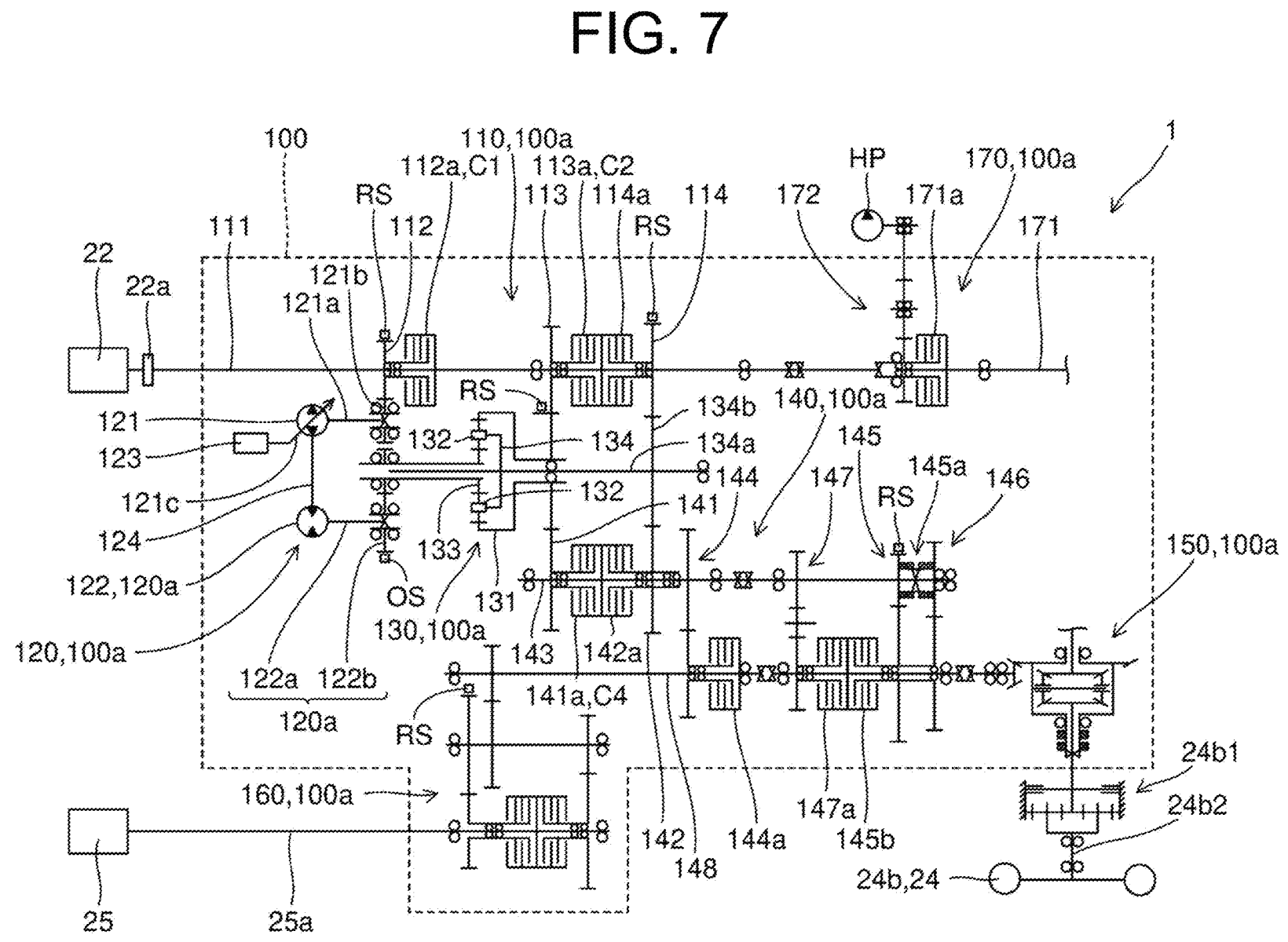

FIG. 7 is a schematic view illustrating the configuration of the transmission apparatus in the second embodiment. The transmission apparatus 100 illustrated in FIG. 7 has the same configuration as that of the transmission apparatus 100 illustrated in FIG. 2 except that the input-side power transmission mechanism 110 has an HST clutch mechanism 112*a*.

More specifically, similar to the transmission apparatus 100 in the first embodiment, the transmission apparatus 100 in the second embodiment includes the input-side power transmission mechanism 110, the HST 120, the planetary gear mechanism 130, and the output-side power transmission mechanism 140. Thus, the following description will be centered on these different points, and the description of the same points will not be made. In addition, the same members and the like as those in the first embodiment will be denoted by the same reference signs for description.

In the second embodiment (the same applies to modified examples described below), the HST clutch mechanism 112*a* will also be referred to as a first clutch mechanism C1, and the first input-side clutch mechanism 113*a* of the input-side power transmission mechanism 110 will also be referred to as a second clutch mechanism C2.

The HST clutch mechanism 112*a* (the first clutch mechanism C1) is provided to engage/disengage the engine 22 with/from the HST 120. In detail, the HST clutch mechanism 112*a* is provided between the first HST input gear 112 and the input shaft 111. Thus, when the HST clutch mechanism 112*a* is brought into the engaged state, the first HST input gear 112 is fixed to the input shaft 111 in a manner to disable relative rotation thereto.

Meanwhile, when the HST clutch mechanism 112*a* is brought into the disengaged state, the first HST input gear 112 becomes rotatable relative to (is disengaged from) the input shaft 111.

Here, when the transmission apparatus 100 is normal, the HST clutch mechanism 112*a* is in the engaged state in order to input the power of the input shaft 111 to the HST 120.

2-2. Power Transmission when Transmission Apparatus is Abnormal

A description will be made on preliminary control in the second embodiment (the power transmission by the transmission apparatus 100 for transmitting the rotary power of the engine 22 to the drive wheels 24 even when the abnormality occurs to the HST 120). As an example of the abnormality, such a case is assumed that, despite the correct operation of the swash plate 121*c* by the gear shift lever, HST output cannot be controlled accurately when a body of the HST pump 121 or the HST motor 122 fails.

In the following description, the preliminary control in the second embodiment will be referred to as second preliminary control. A description will be made on a flow of the second preliminary control with reference to FIG. 8.

FIG. 8 is a flowchart illustrating the flow of the second preliminary control. A time when the flowchart illustrated in FIG. 8 is started will be described below.

In step S31, the controller CU brings the HST clutch mechanism 112*a* into the disengaged state.

Then, the first HST input gear 112 becomes rotatable with respect to (is disengaged from) the input shaft 111, and the power transmission from the input shaft 111 to the HST 120 (in particular, the HST pump 121) is cut off.

That is, the second preliminary control includes canceling the power transmission from the engine 22 to the HST 120 via the input-side power transmission mechanism 110.

In detail, canceling the power transmission includes bringing the first clutch mechanism C1 (the HST clutch mechanism 112*a*) into the disengaged state. After the HST clutch mechanism 112*a* is brought into the disengaged state, the processing proceeds to next step S32.

In step S32, the controller CU shifts a second preliminary control clutch group into an engaged state.

The second preliminary control clutch group includes the first input-side clutch mechanism 113*a*, the first output-side clutch mechanism 141*a*, and the second forward clutch mechanism 145*b*.

That is, the second preliminary control includes bringing the second clutch mechanism C2 (the first input-side clutch mechanism 113*a*) into the engaged state.

In this case, since the first input-side clutch mechanism 113*a* and the first output-side clutch mechanism 141*a* are in the engaged state, the power is transmitted from the input-side power transmission mechanism 110 to the output-side power transmission mechanism 140 via the ring gear 131 of the planetary gear mechanism 130.

In detail, the power of the input shaft 111 of the input-side power transmission mechanism 110 (that is, the rotary power of the engine 22) is input to the first composition output shaft 143 of the output-side power transmission mechanism 140 via the first input gear 113, the ring gear 131, and the first output gear 141.

Here, as described above, since the power transmission from the engine 22 to the HST 120 is cut off, the output of the HST 120 is stopped. Accordingly, in this case, of the ring gear 131, the planetary gear 132, the sun gear 133, and the carrier 134 that constitute the planetary gear mechanism 130, only the ring gear 131 is driven by receiving the rotary power of the engine 22.

That is, the planetary gear mechanism 130 does not combine the power, but simply transmits the power from the input-side power transmission mechanism 110 to the output-side power transmission mechanism 140.

Then, since the second forward clutch mechanism 145*b* is in the engaged state, the power of the first composition output shaft 143 is input to the second composition output shaft 148 of the output-side power transmission mechanism 140 via the second forward gear train 145.

The power that has been input to the second composition output shaft 148 is transmitted to the rear wheels 24*b* via the differential mechanism 150, the brake device 24*b*1, and the drive shaft 24*b*2.

As a result, the rear wheels 24*b* are driven, and the vehicle body 2 (the tractor 1) starts traveling forward although the gear thereof cannot be changed (step S33). That is, the second preliminary control includes transmitting the power from the engine 22 to the drive wheels 24 via the input-side power transmission mechanism 110, the planetary gear mechanism 130, and the output-side power transmission mechanism 140.

The second preliminary control clutch group may include the second input-side clutch mechanism 114*a* and the second output-side clutch mechanism 142*a* instead of the first input-side clutch mechanism 113*a* and the first output-side clutch mechanism 141*a*.

Alternatively, the second preliminary control clutch group may include the first forward clutch mechanism 144*a*, or may include the reverse clutch mechanism 147*a* instead of the second forward clutch mechanism 145*b*.

Next, a description will be made on a flow at the time when the second preliminary control is executed.

The flow at the time when an execution determination of the second preliminary control is started (a determination on whether the second preliminary control can be executed) differs from the flow at the time when the execution determination of the first preliminary control is started (see FIG. 5) only in the following points, and thus the description thereon will not be made.

That is, in the second embodiment, in step S12 (see FIG. 5), all the clutch mechanisms, except the HST clutch mechanism 112*a*, that are provided in the transmission apparatus 100 are shifted into the disengaged state.

That is, in the second embodiment, when the execution determination of the second preliminary control is started, the HST clutch mechanism 112*a* is in the engaged state.

A description will be made on a flow of the execution determination of the second preliminary control with reference to FIG. 9. FIG. 9 is a flowchart illustrating the flow of the execution determination of the second preliminary control.

Since some steps in the flowchart illustrated in FIG. 9 are the same as steps in the flowchart illustrated in FIG. 6, the same steps will be denoted by the same reference signs.

In step S21-1, the controller CU determines whether at least one of the first preliminary control clutch group and the second preliminary control clutch group is operable.

If at least one of the first preliminary control clutch group and the second preliminary control clutch group is operable (Yes in step S21-1), the processing proceeds to next step S22.

If at least one in the first preliminary control clutch group is inoperable, and at least one in the second preliminary control clutch group is inoperable (No in step S21-1), the controller CU determines that the abnormality of the travel system 2*a* is the abnormality of the clutch mechanism that is included in the transmission apparatus 100 (step S23).

Based on this determination, the operator may be notified that the transmission apparatus 100 (in particular, the clutch mechanism) is abnormal via the display unit described above.

In step S22, the controller CU determines whether the HST 120 can output.

If the HST 120 can output (Yes in step S22), the processing proceeds to next step S24.

If the HST 120 is unable to output (No in step S22), the controller CU determines that the abnormality of the travel system 2*a* is the abnormality of (the impossibility to drive) at least one of the HST pump 121 and the HST motor 122 (step S25).

Then, in this case, the second preliminary control is executed (step S29). That is, in the case where the HST 120, in particular, at least one of the HST pump 121 and the HST motor 122 is abnormal, the second preliminary control is executed.

Here, an execution condition of the second preliminary control includes that it is determined in step S21-1 that the second preliminary control clutch group is operable.

Since step S24 and subsequent steps are the same as steps in the flowchart illustrated in FIG. 6, the description thereon will not be made herein.

In the transmission apparatus 100 according to the second embodiment, members (for example, the controller CU and the tilt angle adjustment mechanism 123) related to the execution of the first preliminary control have the same configurations as those in the transmission apparatus 100 according to the first embodiment (see FIG. 2 and FIG. 7).

Therefore, the transmission apparatus 100 in the second embodiment can also execute the first preliminary control.

However, an execution condition of the first preliminary control includes that it is determined in step S21-1 that the first preliminary control clutch group is operable.

2-3. Modified Examples

A description will be made on modified examples (a modified example 2-1, a modified example 2-2, a modified example 2-3, and a modified example 2-4) of the configuration of the transmission apparatus 100 according to the second embodiment.

Also, in the modified example 2-1 to the modified example 2-4, which will be described below, the second preliminary control can be executed. However, the configuration of the transmission apparatus 100 in each of the modified examples partially differs from the configuration of the transmission apparatus 100 illustrated in FIG. 7. Accordingly, the clutch mechanisms that are included in the second preliminary control clutch group differ in the second preliminary control.

Thus, the following description will be centered on these different points.

2-3-1. Modified Example 2-1

Figure 10:
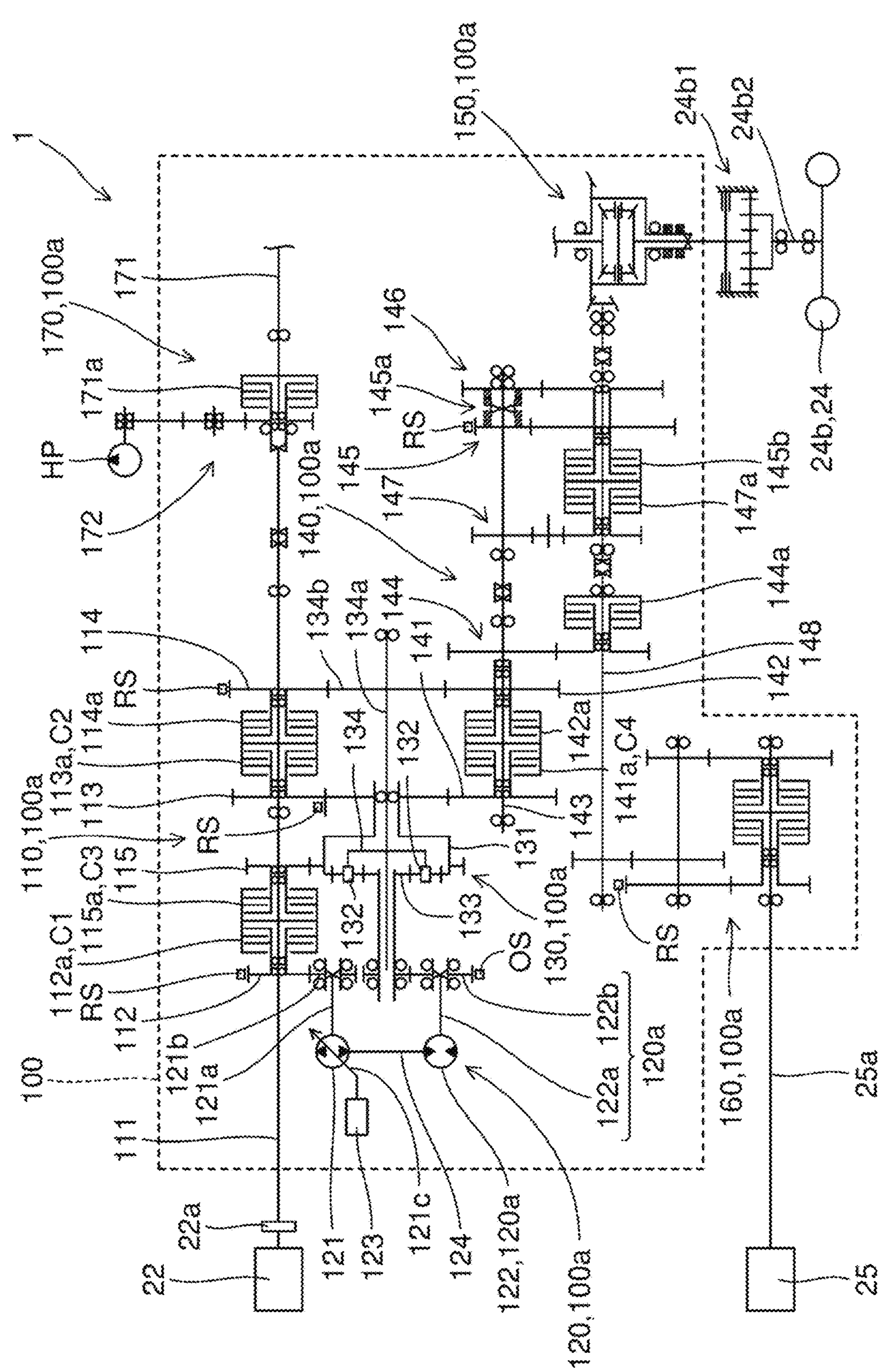
FIG. 10 is a schematic view illustrating a configuration of a transmission apparatus in a modified example 2-1.

A description will be made on the configuration of the transmission apparatus 100 in the modified example 2-1 with reference to FIG. 10. FIG. 10 is a schematic view illustrating the configuration of the transmission apparatus 100 in the modified example 2-1.

The transmission apparatus 100 illustrated in FIG. 10 has the same configuration as that of the transmission apparatus 100 illustrated in FIG. 7 except that the input-side power transmission mechanism 110 has a third input gear 115 and a third input-side clutch mechanism 115*a*.

In the modified example 2-1 to the modified example 2-4, the third input-side clutch mechanism 115*a* will also be referred to as a third clutch mechanism C3.

In addition, in the modified example 2-1 to the modified example 2-4 (same in the second embodiment), the first output-side clutch mechanism 141*a* will also be referred to as a fourth clutch mechanism C4. That is, the output-side power transmission mechanism 140 has the fourth clutch mechanism C4 (that engages/disengages the planetary gear mechanism 130 with/from the drive wheels 24).

The third input gear 115 is rotatably provided on the input shaft 111 via the third input-side clutch mechanism 115*a*. The third input-side clutch mechanism 115*a* engages/disengages the input shaft 111 with/from the third input gear 115.

In detail, when the third input-side clutch mechanism 115*a* is brought into a disengaged state, the third input gear 115 becomes rotatable with respect to (is disengaged from) the input shaft 111. On the other hand, when the third input-side clutch mechanism 115*a* is brought into an engaged state, the third input gear 115 becomes unable to rotate with respect to (is engaged with) the input shaft 111.

In the modified example 2-1, the third input-side clutch mechanism 115*a* is configured to include a friction clutch.

In addition, the third input gear 115 meshes with the external teeth of the ring gear 131 of the planetary gear mechanism 130.

Accordingly, when the third input-side clutch mechanism 115*a* is in the engaged state, the power of the input shaft 111 (that is, the rotary power of the engine 22) is input to the ring gear 131 via the third input gear 115. On the other hand, when the third input-side clutch mechanism 115*a* is in the disengaged state, the power transmission to the ring gear 131 is cut off.

That is, the third clutch mechanism C3 (the third input-side clutch mechanism 115*a*) engages/disengages the engine 22 with/from the planetary gear mechanism 130.

Here, when the transmission apparatus 100 is normal, as described above, the power of the input shaft 111 is input to the planetary gear mechanism 130 via the first input gear 113 or the second input gear 114.

Thus, when the transmission apparatus 100 is normal, the third input-side clutch mechanism 115*a* is in the disengaged state.

In the modified example 2-1, the second preliminary control clutch group includes the third input-side clutch mechanism 115*a*, the first output-side clutch mechanism 141*a*, and the second forward clutch mechanism 145*b*.

Accordingly, when the second preliminary control is executed, the third input-side clutch mechanism 115*a*, the first output-side clutch mechanism 141*a*, and the second forward clutch mechanism 145*b* are brought into the engaged state by the controller CU (see step S32 in FIG. 8).

That is, the second preliminary control includes bringing the third clutch mechanism C3 (the third input-side clutch mechanism 115*a*) into the engaged state and bringing the fourth clutch mechanism C4 (the first output-side clutch mechanism 141*a*) into the engaged state.

In this case, since the third input-side clutch mechanism 115*a* and the first output-side clutch mechanism 141*a* are in the engaged state, the power is transmitted from the input-side power transmission mechanism 110 to the output-side power transmission mechanism 140 via the ring gear 131.

In detail, the power of the input shaft 111 of the input-side power transmission mechanism 110 is input to the first composition output shaft 143 of the output-side power transmission mechanism 140 via the third input gear 115, the ring gear 131, and the first output gear 141.

Then, since the second forward clutch mechanism 145*b* is in the engaged state, as in the first embodiment described above, the power is transmitted from the first composition output shaft 143 to the rear wheels 24*b*.

That is, the second preliminary control includes transmitting the power from the planetary gear mechanism 130 to the drive wheels 24 via the output-side power transmission mechanism 140.

It can be said that the fourth clutch mechanism C4 (the first output-side clutch mechanism 141*a*) engages/disengages the planetary gear mechanism 130 with/from the drive wheels 24.

2-3-2. Modified Example 2-2

Figure 11:
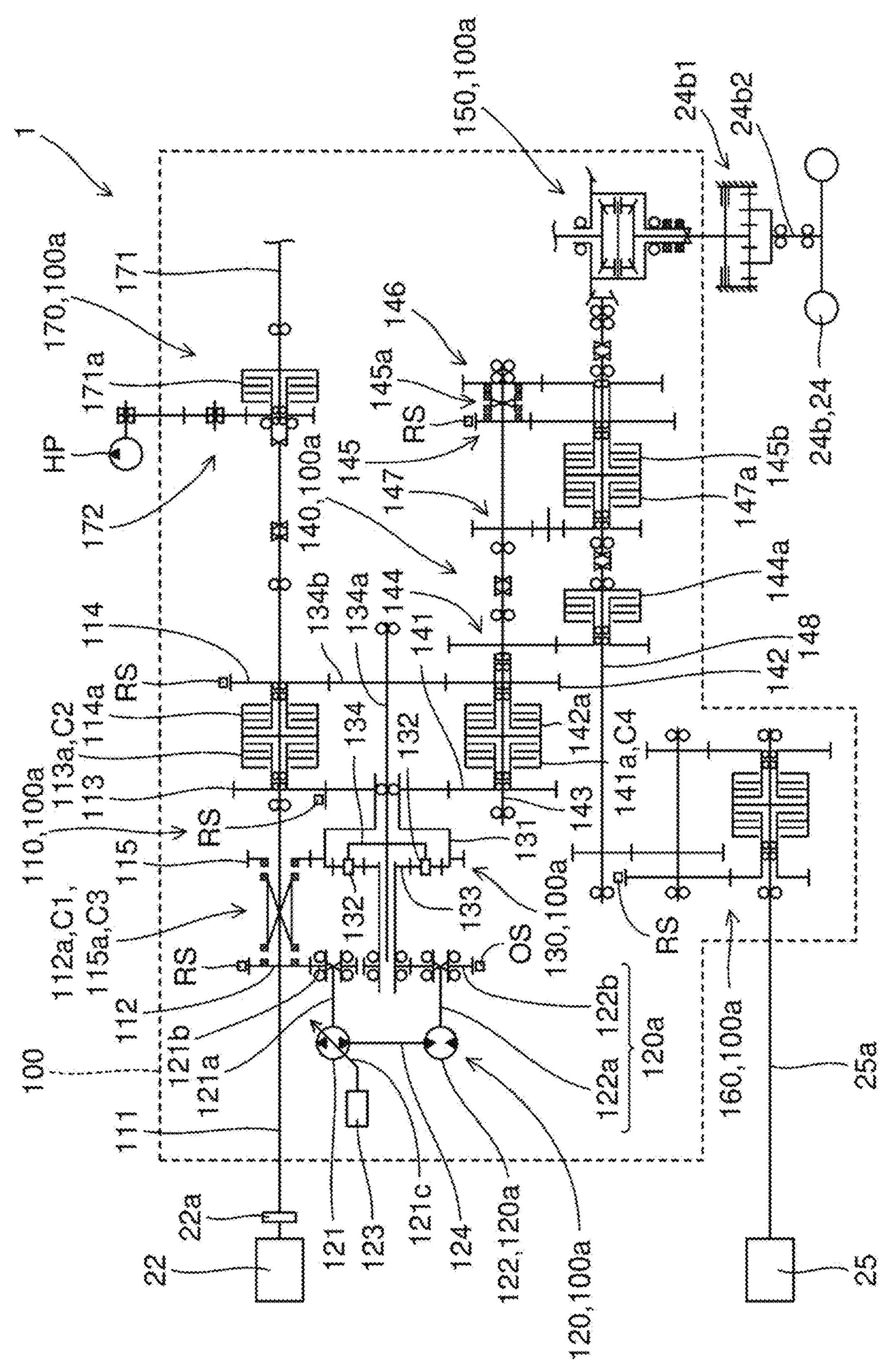
FIG. 11 is a schematic view illustrating a configuration of a transmission apparatus in a modified example 2-2.

FIG. 11 is a schematic view illustrating a configuration of a transmission apparatus 100 in the modified example 2-2.

The transmission apparatus 100 illustrated in FIG. 11 has the same configuration as that of the transmission apparatus 100 illustrated in FIG. 10 except that each of the HST clutch mechanism 112*a* and the third input-side clutch mechanism 115*a* is configured to include a meshing clutch.

That is, each of the HST clutch mechanism 112*a* (the first clutch mechanism C1) and the third input-side clutch mechanism 115*a* (the third clutch mechanism C3) may be configured to include the meshing clutch as illustrated in FIG. 11 or may be configured to include the friction clutch as illustrated in FIG. 10.

In the modified example 2-2, the HST clutch mechanism 112*a* and the third input-side clutch mechanism 115*a* are integrally formed.

2-3-3. Modified Example 2-3

Figure 12:
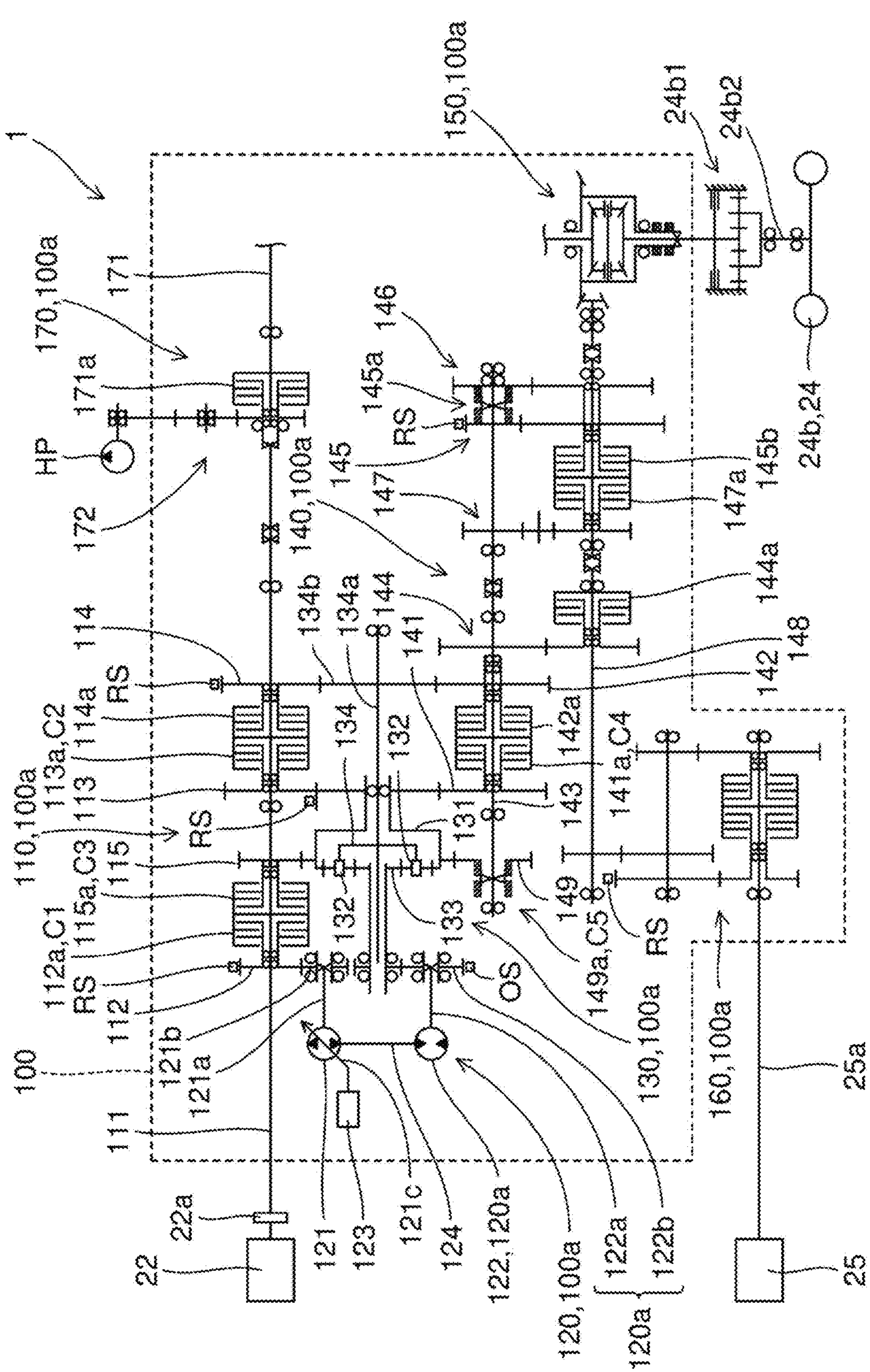
FIG. 12 is a schematic view illustrating a configuration of a transmission apparatus in a modified example 2-3.

A description will be made on a configuration of a transmission apparatus 100 in the modified example 2-3 with reference to FIG. 12. FIG. 12 is a schematic view illustrating the configuration of the transmission apparatus 100 in the modified example 2-3.

The transmission apparatus 100 illustrated in FIG. 12 has the same configuration as that of the transmission apparatus 100 illustrated in FIG. 10 except that the output-side power transmission mechanism 140 has a third output gear 149 and a third output-side clutch mechanism 149*a*.

In the modified example 2-3 and the modified example 2-4, the third output-side clutch mechanism 149*a* will also be referred to as a fifth clutch mechanism C5.

The third output gear 149 is rotatably provided on the first composition output shaft 143 via a third output-side clutch mechanism 149*a*.

The third output-side clutch mechanism 149*a* engages/disengages the first composition output shaft 143 with/from the third output gear 149.

In detail, when the third output-side clutch mechanism 149*a* is brought into a disengaged state, the third output gear 149 becomes rotatable with respect to (is disengaged from) the first composition output shaft 143. On the other hand, when the third output-side clutch mechanism 149*a* is brought into an engaged state, the third output gear 149 becomes unable to rotate with respect to (is engaged with) the first composition output shaft 143.

The third output-side clutch mechanism 149*a* includes a meshing clutch but is not limited thereto, and may include a friction clutch.

In addition, the third output gear 149 meshes with the external teeth of the ring gear 131 of the planetary gear mechanism 130.

Accordingly, when the third output-side clutch mechanism 149*a* is in the engaged state, the power of the ring gear 131 is input to the first composition output shaft 143 via the third output gear 149. On the other hand, when the third output-side clutch mechanism 149*a* is in the disengaged state, the power transmission to the first composition output shaft 143 is cut off.

As described above, the power of the first composition output shaft 143 is transmitted to the right and left rear wheels 24*b*, for example, via the second forward gear train 145 or the like.

Accordingly, the third output-side clutch mechanism 149*a* (the fifth clutch mechanism C5) engages/disengages the planetary gear mechanism 130 with/from the drive wheels 24 (in particular, the rear wheels 24*b*).

Here, when the transmission apparatus 100 is normal, as described above, the planetary gear mechanism 130 outputs the power via the first output gear 141 or the second output gear 142. Thus, when the transmission apparatus 100 is normal, the third output-side clutch mechanism 149*a* is in the disengaged state.

In the modified example 2-3, the second preliminary control clutch group includes the third input-side clutch mechanism 115*a*, the third output-side clutch mechanism 149*a*, and the second forward clutch mechanism 145*b*.

Accordingly, when the second preliminary control is executed, the third input-side clutch mechanism 115*a*, the third output-side clutch mechanism 149*a*, and the second forward clutch mechanism 145*b* are brought into the engaged state by the controller CU (see step S32 in FIG. 8).

That is, the second preliminary control includes bringing the fifth clutch mechanism C5 (the third output-side clutch mechanism 149*a*) into the engaged state.

In this case, since the third input-side clutch mechanism 115*a* and the third output-side clutch mechanism 149*a* are in the engaged state, the power is transmitted from the input-side power transmission mechanism 110 to the output-side power transmission mechanism 140 via the ring gear 131.

In detail, the power of the input shaft 111 of the input-side power transmission mechanism 110 is input to the first composition output shaft 143 of the output-side power transmission mechanism 140 via the third input gear 115, the ring gear 131, and the third output gear 149.

Then, since the second forward clutch mechanism 145*b* is in the engaged state, as in the first embodiment described above, the power is transmitted from the first composition output shaft 143 to the rear wheels 24*b*.

2-3-4. Modified Example 2-4

Figure 13:
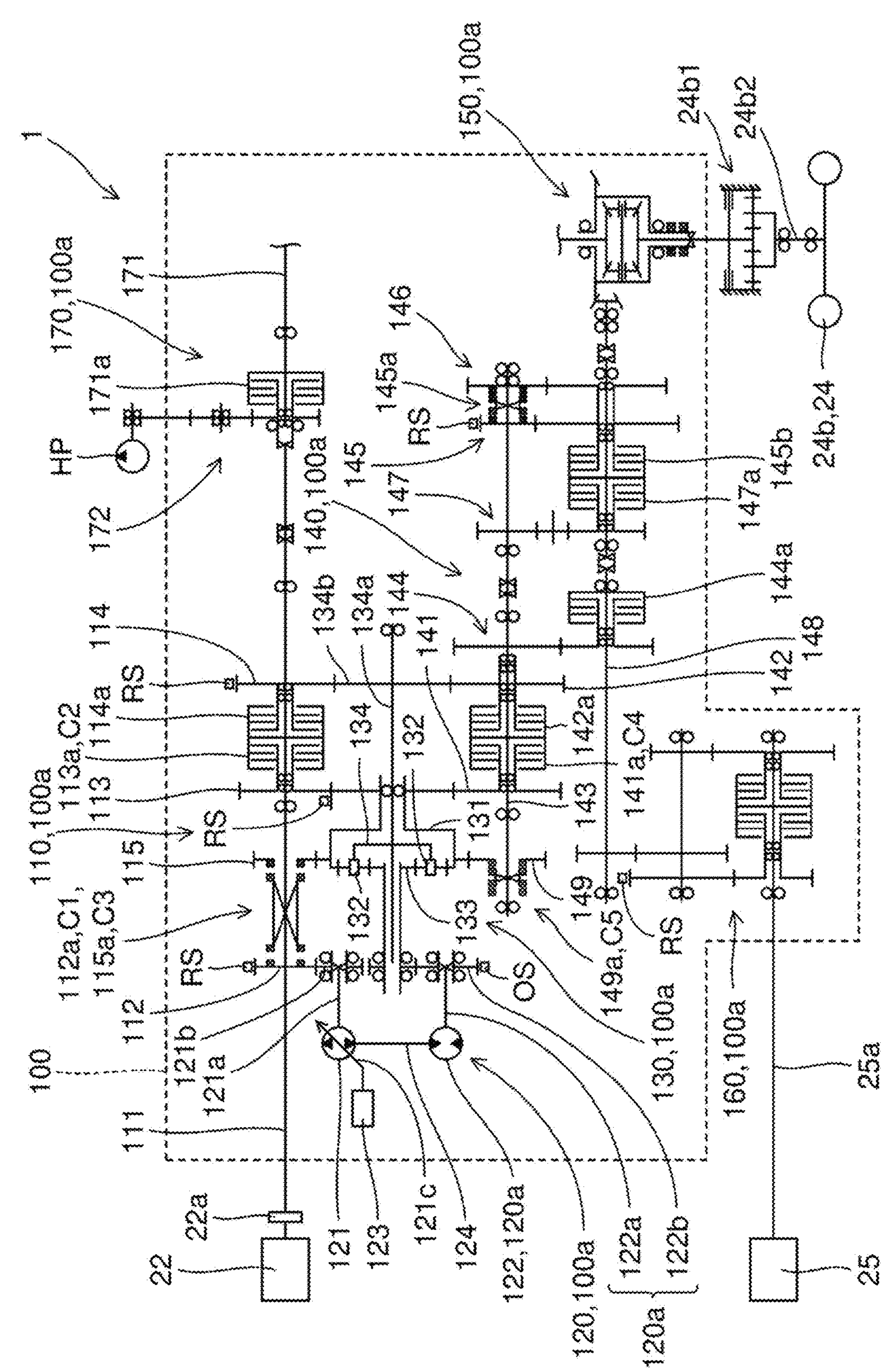
FIG. 13 is a schematic view illustrating a configuration of a transmission apparatus in a modified example 2-4.

FIG. 13 is a schematic view illustrating a configuration of a transmission apparatus 100 in the modified example 2-4.

The transmission apparatus 100 illustrated in FIG. 13 has the same configuration as that of the transmission apparatus 100 illustrated in FIG. 12 except that each of the HST clutch mechanism 112*a* and the third input-side clutch mechanism 115*a* is configured to include a meshing clutch.

In the modified example 2-4, similar to the modified example 2-2 (see FIG. 11), the HST clutch mechanism 112*a* and the third input-side clutch mechanism 115*a* are integrally formed.

2-4. Summary of Second Embodiment

In the second embodiment and the modified examples 2-1 to 2-4, the following effects can be obtained by the above the power transmission (second preliminary control in the second embodiment).

That is, the rotary power of the engine 22 can be transmitted to the drive wheels 24 (the right and left rear wheels 24*b* in the present embodiment) via the input-side power transmission mechanism 110, the planetary gear mechanism 130 (in particular, the ring gear 131), and the output-side power transmission mechanism 140 without interposing the HST 120.

Accordingly, even when the power output of the HST 120 is stopped, that is, even when the abnormality (output abnormality of the HST 120 in the second embodiment) occurs to the HST 120, the transmission apparatus 100 can transmit the rotary power of the engine 22 to the drive wheels 24.

As a result, the drive wheels 24 are driven, and the tractor 1 can travel although the gear thereof cannot be changed.

The above transmission apparatus 100 is configured to be able to travel by effectively using the input-side power transmission mechanism 110, the planetary gear mechanism 130, and the output-side power transmission mechanism 140, which are included in the basic configuration 100*a* of the transmission apparatus 100, even when the abnormality occurs to the HST 120. That is, the clutch mechanism (the first input-side clutch mechanism 113*a*) included in the input-side power transmission mechanism 110, the ring gear 131 of planetary gear mechanism 130, and the clutch mechanism (the first output-side clutch mechanism 141*a*) included in the output-side power transmission mechanism 140 are used.

In this way, it is possible to maintain the basic configuration 100*a* of the transmission apparatus 100.

As it has been described so far, the transmission apparatus 100 can transmit the power even when the HST 120 becomes abnormal, while the basic configuration 100*a* of the transmission apparatus 100 is maintained.

In the case where the power is continuously transmitted from the engine 22 to the HST 120 via the input-side power transmission mechanism 110 while the HST 120 is abnormal, severity of the abnormality of the HST 120 possibly becomes significant. Thus, it is desirable to avoid this.

From this viewpoint, as in the second preliminary control of the second embodiment, it is desirable to include cutting off the power transmission from the engine 22 to the HST 120 via the input-side power transmission mechanism 110 when the HST 120 is abnormal.

In order to reliably cut off the power transmission, the following configuration is desirable as the configuration that the input-side power transmission mechanism 110 has the first clutch mechanism C1 (the HST clutch mechanism 112*a* in the second embodiment) that engages/disengages the engine 22 with/from the HST 120.

That is, as illustrated in FIG. 8, in the above (second preliminary control in the second embodiment), cutting off the power transmission from the engine 22 to the HST 120 via the input-side power transmission mechanism 110 desirably includes bringing the first clutch mechanism C1 into the disengaged state.

In order to reliably transmit the power from the engine 22 to the drive wheels 24, the following configuration is desirable as the configuration that the input-side power transmission mechanism 110 has the second clutch mechanism C2 (the first input-side clutch mechanism 113*a* in the second embodiment) that engages/disengages the engine 22 with/from the planetary gear mechanism 130. That is, as in the second embodiment, in the above the power transmission (second preliminary control in the second embodiment), transmitting the power from the engine 22 to the drive wheels 24 via the input-side power transmission mechanism 110 and the planetary gear mechanism 130 desirably includes bringing the second clutch mechanism C2 into the engaged state.

As described above, when the transmission apparatus 100 is normal, the third clutch mechanism C3 (the third input-side clutch mechanism 115*a* in the modified example 2-1 to the modified example 2-4) is in the disengaged state. On the other hand, as described in the modified example 2-1 to the modified example 2-4, when the abnormality occurs to the HST 120, and the second preliminary control is executed, the third clutch mechanism C3 is brought into the engaged state.

That is, the third clutch mechanism C3 is a dedicated clutch mechanism that implements the power transmission function only when the HST 120 is abnormal, that is, that is actuated only when the HST 120 is abnormal.

In the case where the input-side power transmission mechanism 110 has this third clutch mechanism C3, the power is reliably transmitted from the engine 22 to the planetary gear mechanism 130 by the third clutch mechanism C3 even when the HST 120 is abnormal.

In addition, in the case where the third clutch mechanism C3 is a dedicated clutch that corresponds to the times of abnormality, the third clutch mechanism C3 may have smaller clutch capacity than the clutch mechanism that is regularly used in the transmission apparatus 100. For this reason, the third clutch mechanism C3 is small-sized and easily manufactured at low cost.

As a result, addition of the third clutch mechanism C3 to the input-side power transmission mechanism 110 hardly affects the basic configuration 100*a* of the transmission apparatus 100, and the basic configuration 100*a* is maintained. Thus, in the transmission apparatus 100, as in the modified example 2-1 to the modified example 2-4, the following configuration is desirable as the configuration that the input-side power transmission mechanism 110 has the third clutch mechanism C3.

That is, transmitting the power from the engine 22 to the drive wheels 24 via the input-side power transmission mechanism 110 and the planetary gear mechanism 130 desirably includes bringing the third clutch mechanism C3 into the engaged state.

Even in the case where the transmission apparatus 100 is configured to include the output-side power transmission mechanism 140 capable of transmitting the power of the planetary gear mechanism 130 to the drive wheels 24, it is desirable to reliably transmit the power from the engine 22 to the drive wheels 24.

From this viewpoint, as in the second embodiment, in the above the power transmission (second preliminary control in the second embodiment), transmitting the power from the engine 22 to the drive wheels 24 via the input-side power transmission mechanism 110 and the planetary gear mechanism 130 desirably includes the following.

That is, it is desirable to include transmitting the power from the planetary gear mechanism 130 to the drive wheels 24 via the output-side power transmission mechanism 140.

In order to reliably transmit the power from the planetary gear mechanism 130 to the drive wheels 24 in the configuration that the output-side power transmission mechanism 140 has the fourth clutch mechanism C4 (the first output-side clutch mechanism 141*a* in the second embodiment) that engages/disengages the planetary gear mechanism 130 with/from the drive wheels 24, the following configuration is desirable.

That is, as in the modified example 2-1, transmitting the power from the planetary gear mechanism 130 to the drive wheels 24 via the output-side power transmission mechanism 140 desirably includes bringing the fourth clutch mechanism C4 into the engaged state.

As described above, the fifth clutch mechanism C5 (the third output-side clutch mechanism 149*a* in the second embodiment) is in the disengaged state when the transmission apparatus 100 is normal.

On the other hand, as described in the modified example 2-3 and the modified example 2-4, when the abnormality occurs to the HST 120, and the second preliminary control is executed, the third clutch mechanism C3 is brought into the engaged state.

That is, the fifth clutch mechanism C5 is a dedicated clutch mechanism that implements the power transmission function only when the HST 120 is abnormal, that is, that is actuated only when the HST 120 is abnormal.

In the case where the output-side power transmission mechanism 140 has this fifth clutch mechanism C5, the power is reliably transmitted from the planetary gear mechanism 130 to the drive wheels 24 by the fifth clutch mechanism C5 even when the HST 120 is abnormal.

In addition, in the case where the fifth clutch mechanism C5 is a dedicated clutch that corresponds to the times of abnormality, the fifth clutch mechanism C5 may have smaller clutch capacity than the clutch mechanism that is regularly used in the transmission apparatus 100. For this reason, the fifth clutch mechanism C5 is small-sized and easily manufactured at low cost.

Accordingly, addition of the fifth clutch mechanism C5 to the output-side power transmission mechanism 140 hardly affects the basic configuration 100*a* of the transmission apparatus 100, and the basic configuration 100*a* is maintained. Thus, in the transmission apparatus 100, as in the modified example 2-3 and the modified example 2-4, the following configuration is desirable as the configuration that the output-side power transmission mechanism 140 has the fifth clutch mechanism C5.

That is, transmitting the power from the planetary gear mechanism 130 to the drive wheels 24 via the output-side power transmission mechanism 140 desirably includes bringing the fifth clutch mechanism C5 into the engaged state.

Third Embodiment

3-1. Configuration of Transmission Apparatus

Next, a description will be made on a configuration of a transmission apparatus 100 according to a third embodiment of the present invention.

Figure 14:
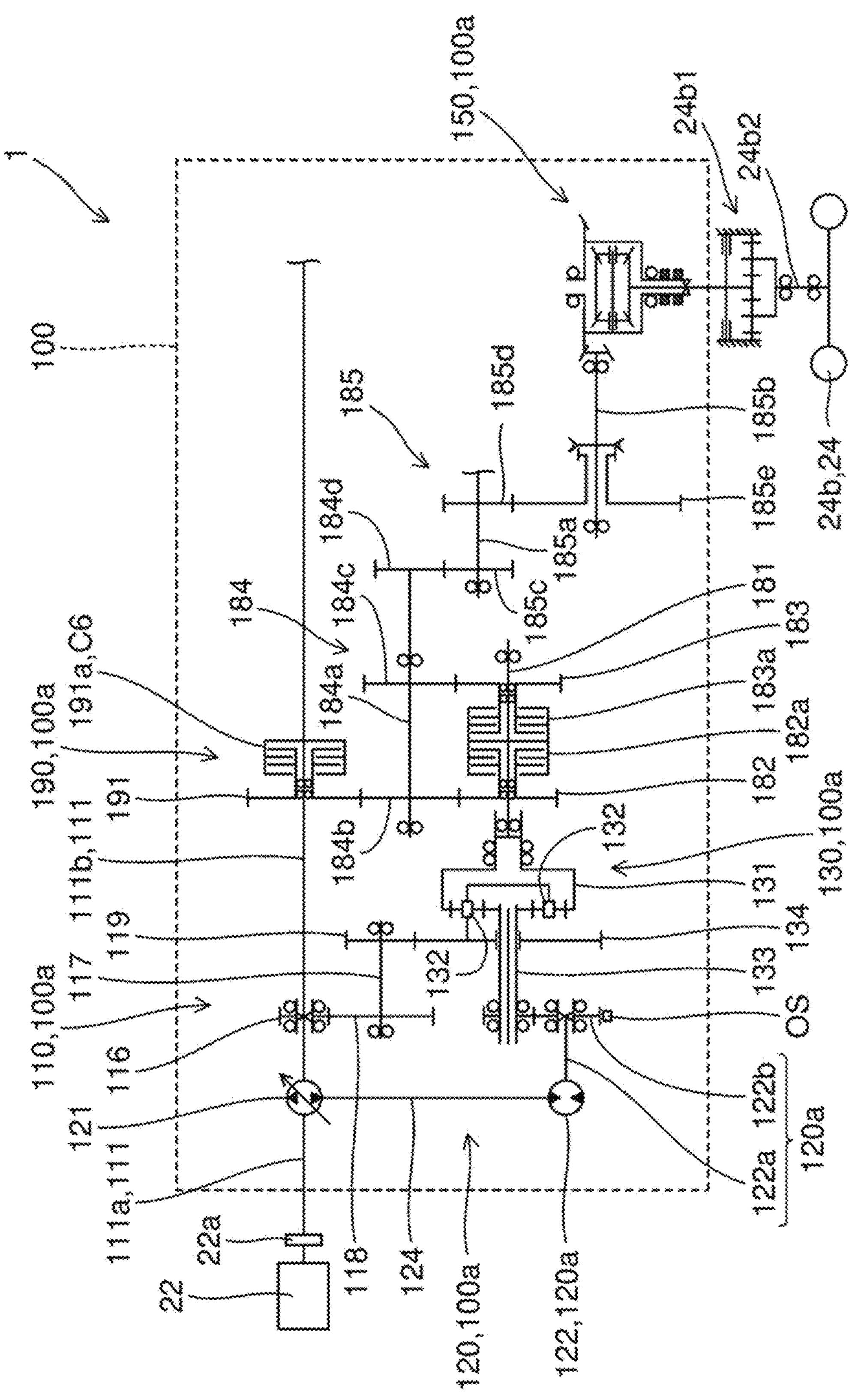
FIG. 14 is a schematic view illustrating a configuration of a transmission apparatus in a third embodiment.

First, a description will be made on the configuration of the transmission apparatus 100 according to the third embodiment with reference to FIG. 14. FIG. 14 is a schematic view illustrating the configuration of the transmission apparatus in the third embodiment.

The transmission apparatus 100 illustrated in FIG. 14 has the same configuration as those of the transmission apparatuses 100 illustrated in FIG. 2, FIG. 7, and the like (the first embodiment and the second embodiment) in a point of including the HMT.

More specifically, similar to the transmission apparatuses 100 in the first embodiment and the second embodiment, the transmission apparatus 100 in the third embodiment includes the input-side power transmission mechanism 110, the HST 120, the planetary gear mechanism 130, the output-side power transmission mechanism 140, the differential mechanism 150, the front-wheel driving force takeoff unit 160, and the PTO unit 170.

However, the transmission apparatus 100 illustrated in FIG. 14 differs from the transmission apparatuses 100 illustrated in FIG. 2, FIG. 7, and the like in the following points.

More specifically, the points are that the configuration of the input-side power transmission mechanism 110 is different, that the configuration of the output-side power transmission mechanism 140 is different, and that the transmission apparatus 100 includes a power takeoff (PTO) mechanism 190.

Thus, the following description will be centered on these different points, and the description of the same points will not be made. The same members and the like as those in the first embodiment and the second embodiment will be denoted by the same reference signs for description.

In FIG. 14, the reverse clutch mechanism 147*a*, the front-wheel driving force takeoff unit 160, the PTO unit 170, and the like are not illustrated for convenience.

The input-side power transmission mechanism 110 includes the input shaft 111, a fourth input gear 116, an intermediate shaft 117, a first intermediate gear 118, and a second intermediate gear 119.

In the third embodiment, the input shaft 111 includes a first input shaft 111*a* and a second input shaft 111*b*.

One end of the first input shaft 111*a* is coupled to the engine 22 via the damper disc 22*a*, and the other end thereof is coupled to the HST pump 121 of the HST 120. Accordingly, the rotary power of the engine 22 is input to the HST pump 121 (the HST 120) by the first input shaft 111*a*. Thus, in the third embodiment, the rotary power of the engine 22 is always input to the HST pump 121.

Here, similar to the first embodiment and the second embodiment, also in the third embodiment, the HST 120 changes the rotary power of the engine 22 steplessly and outputs the changed rotary power. The power that is output from this HST 120 is input to the sun gear 133 of the planetary gear mechanism 130.

One end of the second input shaft 111*b* is coupled to the HST pump 121, and the other end thereof is coupled to the PTO unit 170 (see FIG. 2, FIG. 7, and the like). That is, the first input shaft 111*a* and the second input shaft 111*b* are coupled to each other via the HST pump 121.

The fourth input gear 116 is provided on the second input shaft 111*b*.

The fourth input gear 116 meshes with the first intermediate gear 118 that is provided on the intermediate shaft 117. In addition to the first intermediate gear 118, the second intermediate gear 119 is also provided on the intermediate shaft 117. The second intermediate gear 119 meshes with the carrier 134 of the planetary gear mechanism 130.

Thus, the power of the second input shaft 111*b* (that is, the rotary power of the engine 22) is input to the carrier 134 via the fourth input gear 116, the first intermediate gear 118, the intermediate shaft 117, and the second intermediate gear 119.

When the power is input to the carrier 134, the carrier 134 rotates about the axis on the same line as the rotation axis of the sun gear 133.

When the carrier 134 rotates, the planetary gear 132, which is supported by the carrier 134 in a manner to be freely rotatable (rotatable on its axis), revolves around the sun gear 133.

Meanwhile, as described above, the power of the HST 120 is input to the sun gear 133 that meshes with the planetary gear 132.

Thus, the planetary gear 132 rotates while revolving around the sun gear 133. As a result, the power is output from the ring gear 131 that meshes with the planetary gear 132.

That is, in the third embodiment, the planetary gear mechanism 130 combines the rotary power of the engine 22, which is input to the carrier 134, and the power of the HST 120, which is input to the sun gear 133, and outputs the power (the resultant power) from the ring gear 131.

The output-side power transmission mechanism 140 has a third composition output shaft 181, a fourth output gear 182, a fifth output gear 183, a first transmission shaft unit 184, and a second transmission shaft unit 185. That is, the transmission apparatus 100 includes the first transmission shaft unit 184 and the second transmission shaft unit 185.

The third composition output shaft 181 is coupled to the ring gear 131.

The third composition output shaft 181 is provided with the fourth output gear 182 via a fourth output-side clutch mechanism 182*a*, and is provided with the fifth output gear 183 via a fifth output-side clutch mechanism 183*a*.

The fourth output-side clutch mechanism 182*a* engages/disengages the third composition output shaft 181 with/from the fourth output gear 182.

The fifth output-side clutch mechanism 183*a* engages/disengages the third composition output shaft 181 with/from the fifth output gear 183.

Each of the fourth output-side clutch mechanism 182*a* and the fifth output-side clutch mechanism 183*a* is configured to include a friction clutch, but is not limited thereto. For example, each of the fourth output-side clutch mechanism 182*a* and the fifth output-side clutch mechanism 183*a* may be configured to include a meshing clutch.

The first transmission shaft unit 184 includes a first transmission shaft 184*a*, a first transmission gear 184*b*, a second transmission gear 184*c*, and a third transmission gear 184*d*.

The first transmission gear 184*b*, the second transmission gear 184*c*, and the third transmission gear 184*d* are provided on the first transmission shaft 184*a*.

The first transmission gear 184*b* meshes with the fourth output gear 182, and the second transmission gear 184*c* meshes with the fifth output gear 183. Accordingly, when the fourth output-side clutch mechanism 182*a* is in an engaged state, and the fifth output-side clutch mechanism 183*a* is in a disengaged state, the power of the ring gear 131 is input to the first transmission shaft 184*a* via the third composition output shaft 181, the fourth output gear 182, and the first transmission gear 184*b*.

Meanwhile, when the fourth output-side clutch mechanism 182*a* is in a disengaged state, and the fifth output-side clutch mechanism 183*a* is in an engaged state, the power of the ring gear 131 is input to the first transmission shaft 184*a* via the third composition output shaft 181, the fifth output gear 183, and the second transmission gear 184*c*.

That is, the first transmission shaft unit 184 is coupled to the planetary gear mechanism 130 via the third composition output shaft 181, the fourth output gear 182, and the fifth output gear 183.

The second transmission shaft unit 185 includes a second transmission shaft 185*a*, a third transmission shaft 185*b*, a fourth transmission gear 185*c*, a fifth transmission gear 185*d*, and a sixth transmission gear 185*e*.

The second transmission shaft 185*a* is provided with the fourth transmission gear 185*c* and the fifth transmission gear 185*d*, and the third transmission shaft 185*b* is provided with the sixth transmission gear 185*e*.

The fourth transmission gear 185*c* meshes with the third transmission gear 184*d*. Accordingly, the power of the first transmission shaft 184*a* is input to the second transmission shaft 185*a* via the third transmission gear 184*d* and the fourth transmission gear 185*c*. That is, the second transmission shaft unit 185 is coupled to the first transmission shaft unit 184.

The fifth transmission gear 185*d* meshes with the sixth transmission gear 185*e*. Accordingly, the power of the second transmission shaft 185*a* is input to the third transmission shaft 185*b* via the fifth transmission gear 185*d* and the sixth transmission gear 185*e*.

The third transmission shaft 185*b* is coupled to the differential mechanism 150. In this way, the power of the third transmission shaft 185*b* is transmitted to the right and left rear wheels 24*b* (the drive wheels 24) via the differential mechanism 150.

The PTO mechanism 190 includes a takeoff gear 191. The takeoff gear 191 is provided on the second input shaft lib via a PTO clutch mechanism 191*a*. The PTO clutch mechanism 191*a* engages/disengages the takeoff gear 191 with/from the second input shaft 111*b*.

In detail, when the PTO clutch mechanism 191*a* is brought into a disengaged state, the takeoff gear 191 becomes rotatable with respect to (is disengaged from) the second input shaft 111*b*.

On the other hand, when the PTO clutch mechanism 191*a* is brought into an engaged state, the takeoff gear 191 becomes unable to rotate with respect to (is engaged with) the second input shaft 111*b*.

In FIG. 14, the PTO clutch mechanism 191*a* is configured to include a friction clutch.

Here, the PTO clutch mechanism 191*a* will also be referred to as a sixth clutch mechanism C6. That is, the PTO mechanism 190 has the sixth clutch mechanism C6 (the PTO clutch mechanism 191*a*).

The takeoff gear 191 meshes with the first transmission gear 184*b*. Thus, when the PTO clutch mechanism 191*a* is in the engaged state, the power of the second input shaft 111*b* (that is, the rotary power of the engine 22) is input to the first transmission shaft 184*a* via the takeoff gear 191 and the first transmission gear 184*b*.

As described above, the power that has been transmitted to the first transmission shaft 184*a* is transmitted to the drive wheels 24.

That is, the PTO mechanism 190 can take off the rotary power of the engine 22 to the drive wheels 24, and the sixth clutch mechanism C6 (the PTO clutch mechanism 191*a*) engages/disengages the engine 22 with/from the drive wheels 24.

3-2. Power Transmission by Transmission Apparatus

3-2-1. Power Transmission when Transmission Apparatus is Normal

A description will be made on the clutch mechanisms that are particularly related to the power transmission from the engine 22 to the rear wheels 24*b* when the transmission apparatus 100 in the third embodiment is normal.

As illustrated in FIG. 14, for example, in the case where the forward/reverse switching lever described above is located at the neutral position, the fourth output-side clutch mechanism 182*a*, the fifth output-side clutch mechanism 183*a*, and the PTO clutch mechanism 191*a* are brought into the disengaged state.

When the forward/reverse switching lever is located at the forward position (when the tractor 1 travels forward), one of the fourth output-side clutch mechanism 182*a* and the fifth output-side clutch mechanism 183*a* is brought into the engaged state, and the other thereof is brought into the disengaged state. The PTO clutch mechanism 191*a* is brought into the disengaged state.

In this way, the power is transmitted from the engine 22 to the rear wheels 24*b*, and the rear wheels 24*b* are driven in the forward direction.

As a result, the tractor 1 can travel forward.

3-2-2. Power Transmission when Transmission Apparatus is Abnormal

A description will be made on preliminary control in the third embodiment (the power transmission by the transmission apparatus 100 for transmitting the rotary power of the engine 22 to the drive wheels 24 even when the abnormality occurs to the HST 120).

In the following description, the preliminary control in the third embodiment will be referred to as third preliminary control.

A description will be made on a flow of the third preliminary control with reference to FIG. 15.

Figure 15:
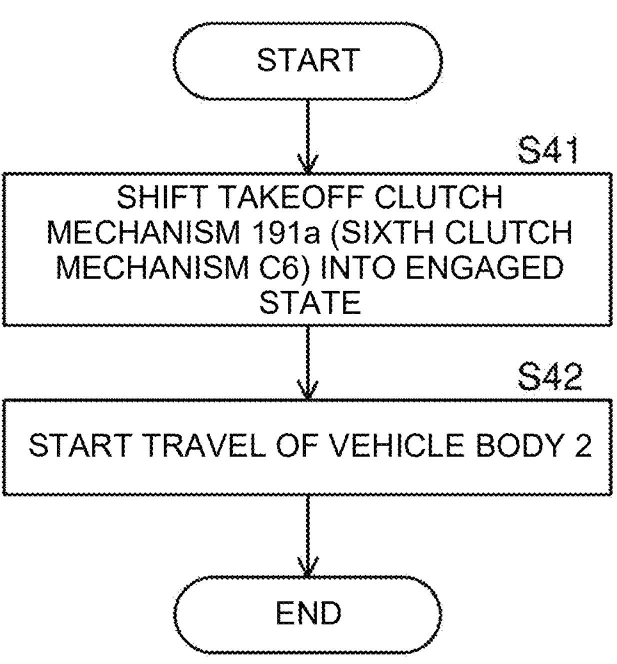
FIG. 15 is a flowchart illustrating a flow of third preliminary control.

FIG. 15 is a flowchart illustrating the flow of the third preliminary control. A time when the flowchart illustrated in FIG. 15 is started will be described below.

In step S41, the controller CU shifts the PTO clutch mechanism 191*a* into the engaged state. That is, the third preliminary control includes bringing the sixth clutch mechanism C6 (the PTO clutch mechanism 191*a* in the third embodiment) into the engaged state.

Then, the takeoff gear 191 becomes unable to rotate with respect to (is engaged with) the second input shaft 111*b*.

In this way, the power of the second input shaft 111*b* (the rotary power of the engine 22) is transmitted to the right and left rear wheels 24*b* via the first transmission shaft unit 184, the second transmission shaft unit 185, and the differential mechanism 150.

As a result, the rear wheels 24*b* are driven, and the vehicle body 2 (the tractor 1) starts traveling (step S42).

That is, the third preliminary control includes transmitting the power from the engine 22 to the drive wheels 24 via the PTO mechanism 190.

Figure 16:
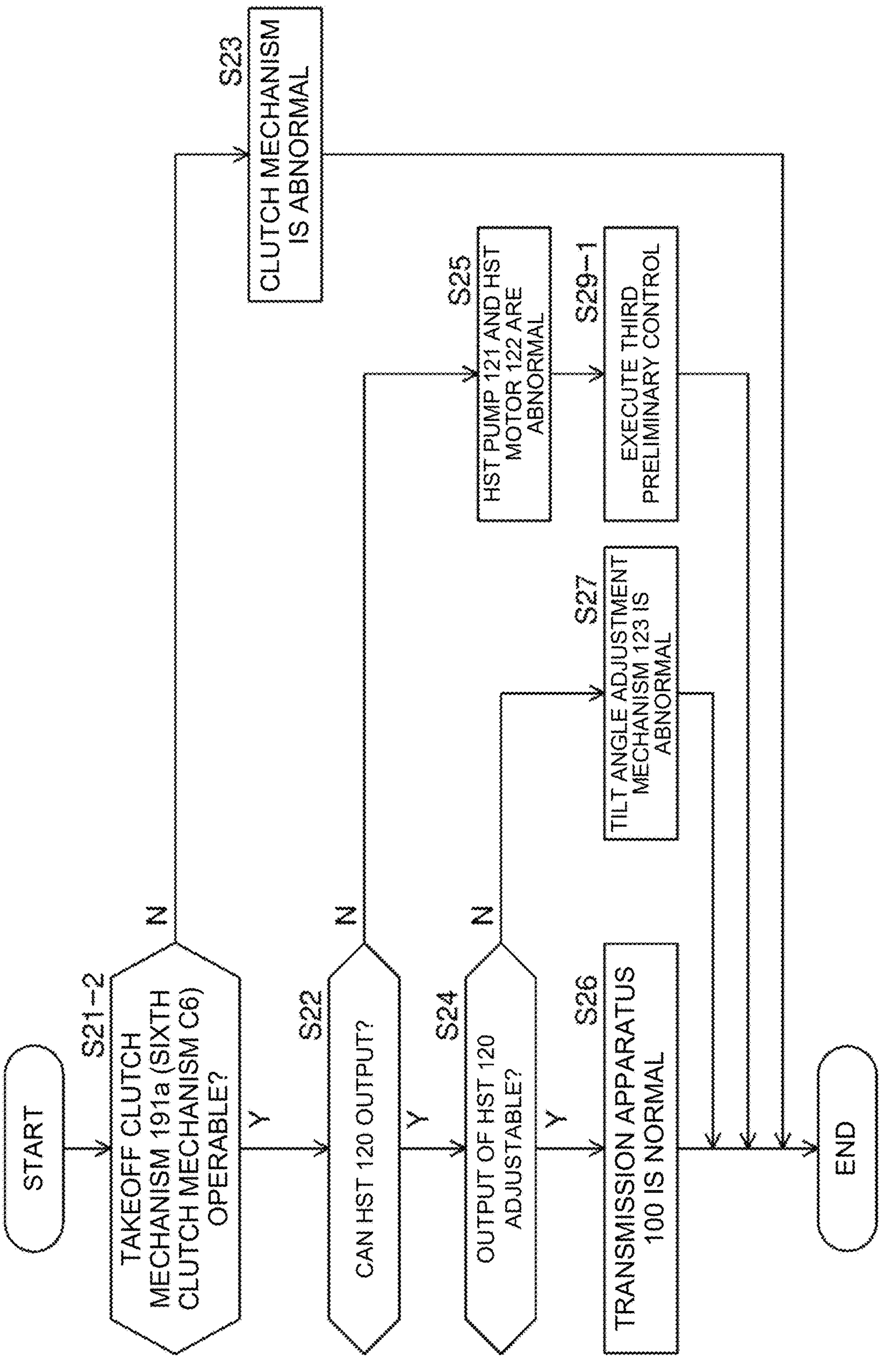
FIG. 16 is a flowchart illustrating a flow of an execution determination of the third preliminary control.

A description will be made on a flow of an execution determination of the third preliminary control with reference to FIG. 16. FIG. 16 is a flowchart illustrating the flow of the execution determination of the third preliminary control.

Since some steps in the flowchart illustrated in FIG. 16 are the same as steps in the flowchart illustrated in FIG. 6 or FIG. 9, the same steps will be denoted by the same reference signs.

In step S21-2, the controller CU determines whether at least the PTO clutch mechanism 191*a* is operable.

If at least the PTO clutch mechanism 191*a* is operable (Yes in step S21-2), the processing proceeds to next step S22.

If the PTO clutch mechanism 191*a* is inoperable (No in step S21-2), the controller CU determines that the abnormality of the travel system 2*a* is the abnormality of the clutch mechanism that is included in the transmission apparatus 100 (step S23).

In step S22, the controller CU determines whether the HST 120 can output.

If the HST 120 can output (Yes in step S22), the processing proceeds to next step S24.

If the HST 120 is unable to output (No in step S22), the controller CU determines that the abnormality of the travel system 2*a* is the abnormality of (the impossibility to drive) at least one of the HST pump 121 and the HST motor 122 (step S25).

Then, in this case, the third preliminary control is executed (step S29-1).

That is, in the case where the HST 120, in particular, at least one of the HST pump 121 and the HST motor 122 is abnormal, the third preliminary control is executed.

Since step S24 and subsequent steps are the same as those in the flowchart illustrated in FIG. 6 or FIG. 9 except that step S28 is omitted, the description thereon will not be made herein.

As described above, the PTO clutch mechanism 191*a* is in the disengaged state when the transmission apparatus 100 is normal. That is, the PTO clutch mechanism 191*a* implements the power transmission function only when the HST 120 is abnormal.

That is, the PTO mechanism 190 that includes the PTO clutch mechanism 191*a* implements the function to take off the rotary power of the engine 22 only when the HST 120 is abnormal.

3-3. Modified Examples

A description will be made on modified examples (a modified example 3-1, a modified example 3-2, and a modified example 3-3) of the configuration of the transmission apparatus 100 according to the third embodiment.

Also, in the modified example 3-1 to the modified example 3-3, which will be described below, the third preliminary control can be executed.

3-3-1. Modified Example 3-1

Figure 17:
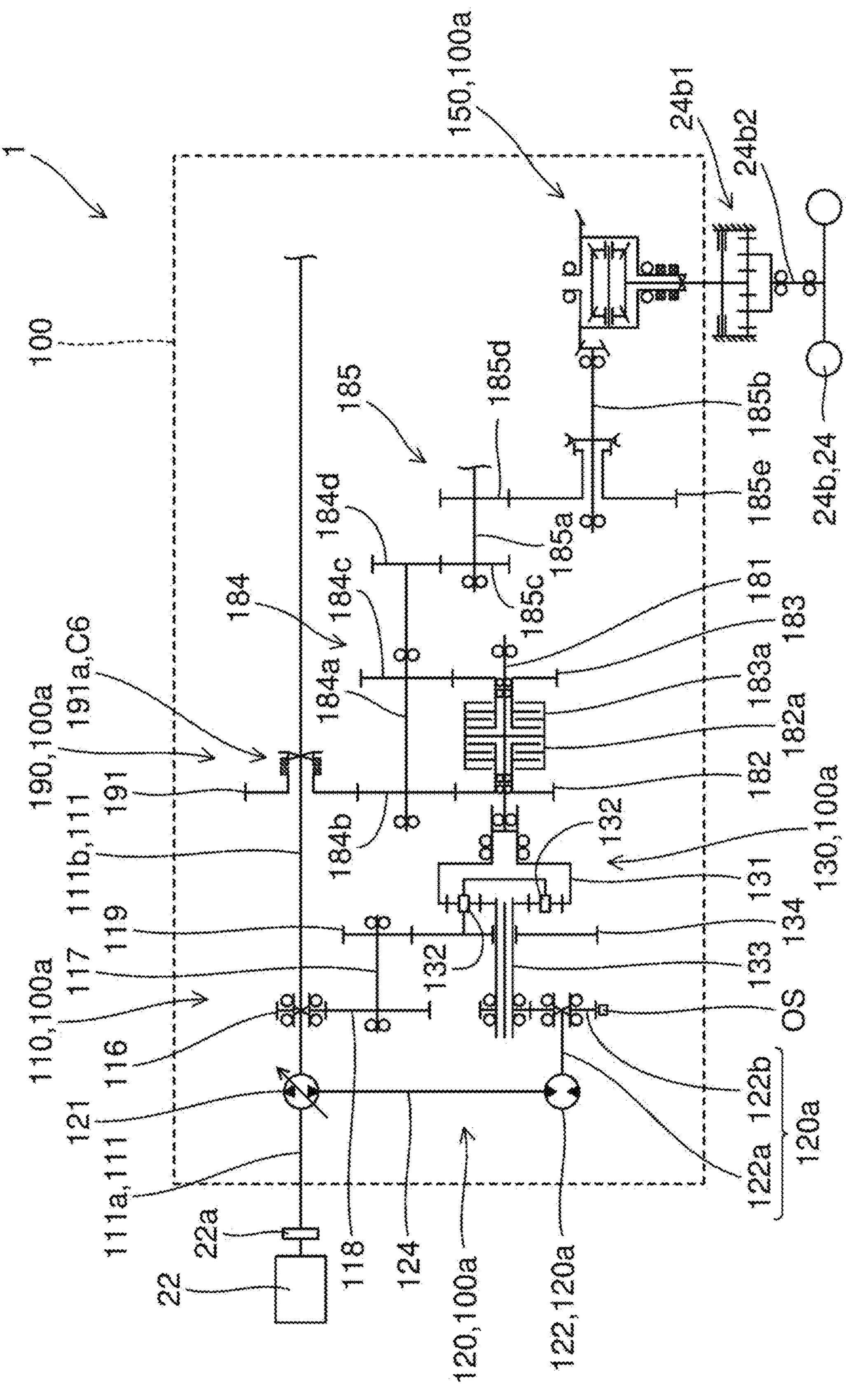
FIG. 17 is a schematic view illustrating a configuration of a transmission apparatus in a modified example 3-1.

FIG. 17 is a schematic view illustrating a configuration of a transmission apparatus 100 in the modified example 3-1. The transmission apparatus 100 illustrated in FIG. 17 has the same configuration as that of the transmission apparatus 100 illustrated in FIG. 14 except that the PTO clutch mechanism 191*a* includes a meshing clutch.

That is, the PTO clutch mechanism 191*a* (the sixth clutch mechanism C6) may be configured to include the meshing clutch as illustrated in FIG. 17 or may be configured to include a friction clutch as illustrated in FIG. 14.

3-3-2. Modified Example 3-2

Figure 18:
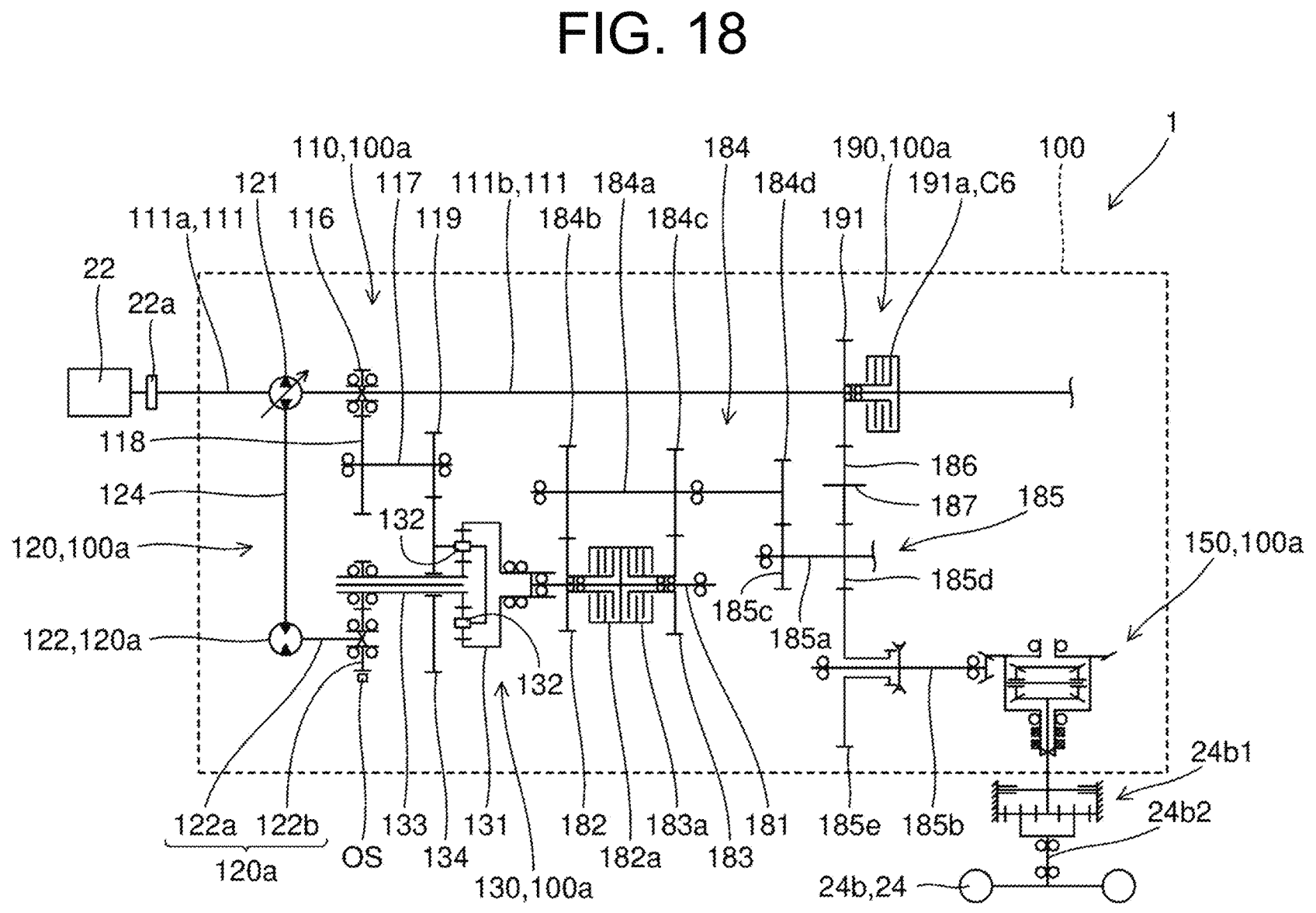

FIG. 18 is a schematic view illustrating a configuration of a transmission apparatus 100 in the modified example 3-2.

The transmission apparatus 100 illustrated in FIG. 18 has the same configuration as that of the transmission apparatus 100 illustrated in FIG. 14 except that the PTO mechanism 190 is coupled to the second transmission shaft unit 185 via a counter gear 186.

In detail, the counter gear 186 is provided on a counter shaft 187. The counter gear 186 and the counter shaft 187 are included in the output-side power transmission mechanism 140. The counter gear 186 meshes with the fifth transmission gear 185*d*, and also meshes with the takeoff gear 191.

That is, the PTO mechanism 190 may be coupled to the second transmission shaft unit 185 (via the counter gear 186) as illustrated in FIG. 18, or may be coupled to the first transmission shaft unit 184 as illustrated in FIG. 14.

That is, the PTO mechanism 190 is coupled to one of the first transmission shaft unit 184 and the second transmission shaft unit 185.

3-3-3. Modified Example 3-3

Figure 19:
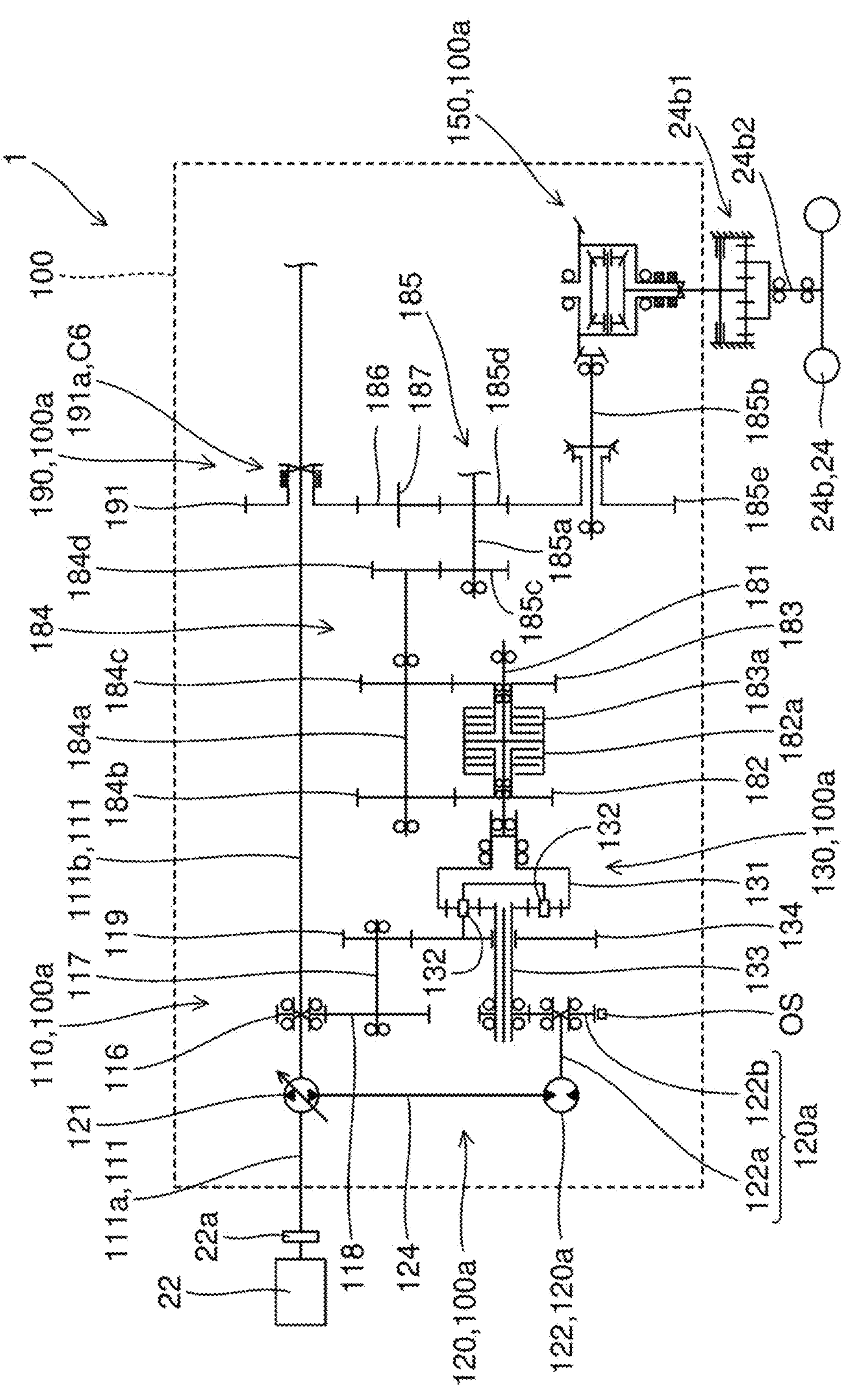
FIG. 19 is a schematic view illustrating a configuration of a transmission apparatus in a modified example 3-3.

FIG. 19 is a schematic view illustrating a configuration of a transmission apparatus 100 in the modified example 3-3. The transmission apparatus 100 illustrated in FIG. 19 has the same configuration as that of the transmission apparatus 100 illustrated in FIG. 18 except that the PTO clutch mechanism 191*a* includes the meshing clutch.

3-4. Summary of Third Embodiment

In the third embodiment and the modified examples 3-1 to 3-3, the following effects can be obtained by the above power transmission (the third preliminary control in the third embodiment).

That is, the rotary power of the engine 22 can be transmitted to the drive wheels 24 (the right and left rear wheels 24*b* in the present embodiment) via the PTO mechanism 190 without interposing the HST 120.

Accordingly, even when the power output of the HST 120 is stopped, that is, even when the abnormality (the output abnormality of the HST 120 in the third embodiment) occurs to the HST 120, the transmission apparatus 100 can transmit the rotary power of the engine 22 to the drive wheels 24.

As a result, the drive wheels 24 are driven, and the tractor 1 can travel although the gear thereof cannot be changed.

In addition, the above transmission apparatus 100 is added with the PTO mechanism 190 that implements the power transmission function only when the HST 120 is abnormal.

Furthermore, in the case where the PTO mechanism 190 is a dedicated member that corresponds to the times of abnormality, the PTO mechanism 190 may have smaller power transmission capacity than the power takeoff mechanism that is regularly used in the transmission apparatus 100. For this reason, the PTO mechanism 190 is small-sized and easily manufactured at low cost.

Accordingly, even when the PTO mechanism 190 is added, there is no need to change the basic configuration 100*a* of the transmission apparatus 100, and thus the basic configuration 100*a* can be maintained.

As it has been described so far, the transmission apparatus 100 can transmit the power even when the HST 120 becomes abnormal, while the basic configuration 100*a* of the transmission apparatus 100 is maintained.

In order to reliably transmit the power from the engine 22 to the drive wheels 24, the following configuration is desirable as the configuration that the PTO mechanism 190 has the sixth clutch mechanism C6 (the PTO clutch mechanism 191*a* in the third embodiment) that engages/disengages the engine 22 with/from the drive wheels 24.

That is, as illustrated in FIG. 15, in the above the power transmission (third preliminary control), transmitting the power from the engine 22 to the drive wheels 24 via the PTO mechanism 190 desirably includes bringing the sixth clutch mechanism C6 into the engaged state.

The following configuration is desirable from a viewpoint of suppressing an increase in the number of components, which is caused by adding the PTO mechanism 190 to the transmission apparatus 100, in the configuration that the transmission apparatus 100 includes the first transmission shaft unit 184 and the second transmission shaft unit 185.

That is, as illustrated in FIG. 14 and FIG. 18, the PTO mechanism 190 is desirably coupled to one of the first transmission shaft unit 184 and the second transmission shaft unit 185.

The following configuration is desirable from a viewpoint of avoiding such a situation where the power transmission from the engine 22 to the drive wheel 24 by the transmission apparatus 100 is stopped due to the HST 120 being unable to output.

More specifically, as in the second embodiment and the third embodiment, when the HST 120 cannot output, the above the power transmission (the second preliminary control in the first embodiment or the third preliminary control in the third embodiment) is desirably executed.

For example, when at least one of the HST pump 121 and the HST motor 122 that constitute the HST 120 becomes abnormal, the HST 120 becomes unable to output.

In particular, in this case, it is desirable to avoid the power transmission to the drive wheels 24 from being stopped.

From this viewpoint, as in the second embodiment and the third embodiment, the case where the HST 120 is unable to output desirably includes that at least one of the HST pump 121 and the HST motor 122 is abnormal.

From a viewpoint of reliably making the abnormality determination of the HST 120, as in the present embodiment (the first embodiment, the second embodiment, and the third embodiment), the transmission apparatus 100 desirably includes the output sensor OS that detects the output of the HST 120. Then, the abnormality determination of the HST 120 is desirably made on the basis of the detection information by the output sensor OS.

From a viewpoint of reliably detecting the output of the HST 120, as in the present embodiment (the first embodiment, the second embodiment, and the third embodiment), the output sensor OS is desirably arranged in the output unit 120*a* of the HST 120.

4. Another Example of First Preliminary Control

A description will be made on another example of the first preliminary control (the preliminary control in the first embodiment).

In the following description, another example of the first preliminary control will be referred to as fourth preliminary control.

Similar to the second embodiment, in the first embodiment, the first input-side clutch mechanism 113*a* is also referred to as the second clutch mechanism C2, and the first output-side clutch mechanism 141*a* is also referred to as the fourth clutch mechanism C4 (see FIG. 2).

That is, the input-side power transmission mechanism 110 (see FIG. 2) in the first embodiment has the second clutch mechanism C2 (the first input-side clutch mechanism 113*a*) (that engages/disengages the engine 22 with/from the planetary gear mechanism 130).

In addition, the output-side power transmission mechanism 140 (see FIG. 2) has the fourth clutch mechanism C4 (that engages/disengages the planetary gear mechanism 130 with/from the drive wheel 24).

Figure 20:
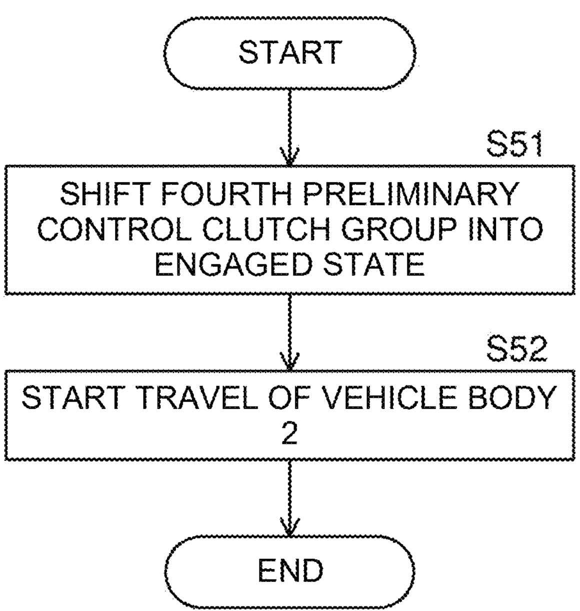
FIG. 20 is a flowchart illustrating a flow of fourth preliminary control.

A description will be made on a flow of the fourth preliminary control with reference to FIG. 2 and FIG. 20. FIG. 20 is a flowchart illustrating the flow of the fourth preliminary control.

A time when the flowchart illustrated in FIG. 20 is started will be described below.

In step S51, the controller CU shifts a fourth preliminary control clutch group into an engaged state. The above fourth preliminary control clutch group includes the first input-side clutch mechanism 113*a*, the first output-side clutch mechanism 141*a*, and the first forward clutch mechanism 144*a*.

That is, the fourth preliminary control includes bringing the second clutch mechanism C2 (the first input-side clutch mechanism 113*a* in the first embodiment) into the engaged state and bringing the fourth clutch mechanism C4 (the first output-side clutch mechanism 141*a* in the first embodiment) into the engaged state.

In this case, since the first input-side clutch mechanism 113*a* and the first output-side clutch mechanism 141*a* are in the engaged state, the power is transmitted from the input-side power transmission mechanism 110 to the output-side power transmission mechanism 140 via the ring gear 131 of the planetary gear mechanism 130.

In detail, the power of the input shaft 111 of the input-side power transmission mechanism 110 (that is, the rotary power of the engine 22) is input to the first composition output shaft 143 of the output-side power transmission mechanism 140 via the first input gear 113, the ring gear 131, and the first output gear 141.

In the above case, for example, when the abnormality occurs to the HST 120, and the HST 120 becomes unable to output, of the ring gear 131, the planetary gear 132, the sun gear 133, and the carrier 134 that constitute the planetary gear mechanism 130, only the ring gear 131 rotates. Since the second input-side clutch mechanism 114*a* and the second output-side clutch mechanism 142*a* are disengaged, and the carrier 134 rotates idle, the power of the sun gear 133 is not transmitted to the ring gear 131 even when the HST 120 drives the sun gear 133 at the uncontrollable rotational speed.

That is, the planetary gear mechanism 130 does not combine the power, and simply transmits the power from the input-side power transmission mechanism 110 to the output-side power transmission mechanism 140.

Then, since the first forward clutch mechanism 144*a* is in the engaged state, the power of the first composition output shaft 143 is input to the second composition output shaft 148 of the output-side power transmission mechanism 140 via the first forward gear train 144.

The power that has been input to the second composition output shaft 148 is transmitted to the rear wheels 24*b* via the differential mechanism 150, the brake device 24*b*1, and the drive shaft 24*b*2.

As a result, the rear wheels 24*b* are driven, and the vehicle body 2 (the tractor 1) starts traveling forward while the gear thereof cannot be shifted (step S52).

That is, the fourth preliminary control includes transmitting the power from the engine 22 to the drive wheels 24 via the input-side power transmission mechanism 110 and the planetary gear mechanism 130.

In addition, transmitting the power from the engine 22 to the drive wheels 24 via the input-side power transmission mechanism 110 and the planetary gear mechanism 130 includes transmitting the power from the planetary gear mechanism 130 to the drive wheels 24 via the output-side power transmission mechanism 140.

The fourth preliminary control clutch group may include the second input-side clutch mechanism 114*a* and the second output-side clutch mechanism 142*a* instead of the first input-side clutch mechanism 113*a* and the first output-side clutch mechanism 141*a*.

In this case, only the engine power is transmitted to the drive wheels 24 via the carrier input/output gear 134*b* that is connected to the carrier input/output shaft 134*a* of the planetary gear mechanism 130. Since the first input-side clutch mechanism 113*a* and the first output-side clutch mechanism 141*a* are disengaged, and the ring gear 131 rotates idle, the power of the sun gear 133 is not transmitted to the carrier 134 even when the abnormal rotation of the HST 120 drives the sun gear 133.

Alternatively, the fourth preliminary control clutch group may include the second forward clutch mechanism 145*b* or may include the reverse clutch mechanism 147*a* instead of the first forward clutch mechanism 144*a*.

A description will be made on a flow at the time when the fourth preliminary control is executed (when the flowchart illustrated in FIG. 20 is started).

Figure 21:
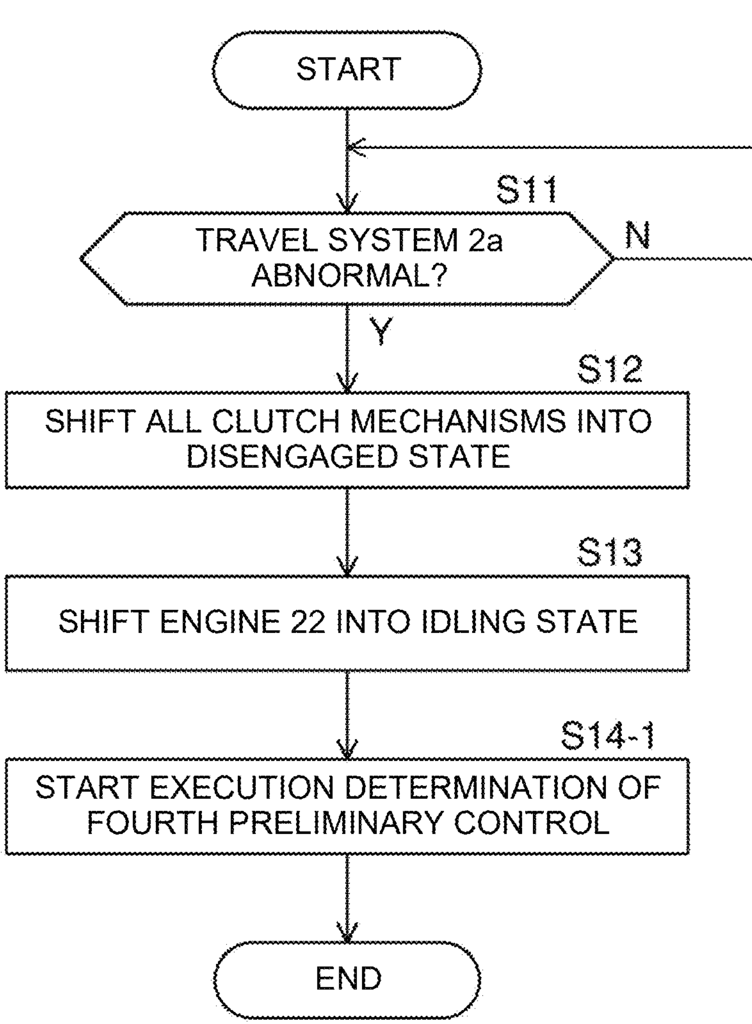
FIG. 21 is a flowchart illustrating a flow at the time when an execution determination of the fourth preliminary control is started.

First, a description will be made on a flow at the time when an execution determination of the fourth preliminary control (a determination on whether the fourth preliminary control can be executed) is started with reference to FIG. 21. FIG. 21 is a flowchart illustrating the flow at the time when the execution determination of the fourth preliminary control is started. Since some steps in the flowchart illustrated in FIG. 21 are the same as steps in the flowchart illustrated in FIG. 5, the same steps will be denoted by the same reference signs, and the description thereon will be simplified.

The flowchart illustrated in FIG. 21 is started, for example, at timing at which the engine 22 is started, timing at which the vehicle body 2 starts traveling, or the like.

Upon the start of the execution determination of the fourth preliminary control, first, the controller CU (see FIG. 3) determines whether the abnormality has occurred to the travel system 2*a* (see FIG. 1) (step S11).

If the abnormality has occurred to the travel system 2*a*, the controller CU shifts all the clutch mechanisms of the transmission apparatus 100 into the engaged state (step S12), and thereafter shifts the engine 22 into the idling state (step S13).

After the engine 22 is brought into the idling state, the controller CU starts the execution determination of the fourth preliminary control (step S14-1).

Figure 22:
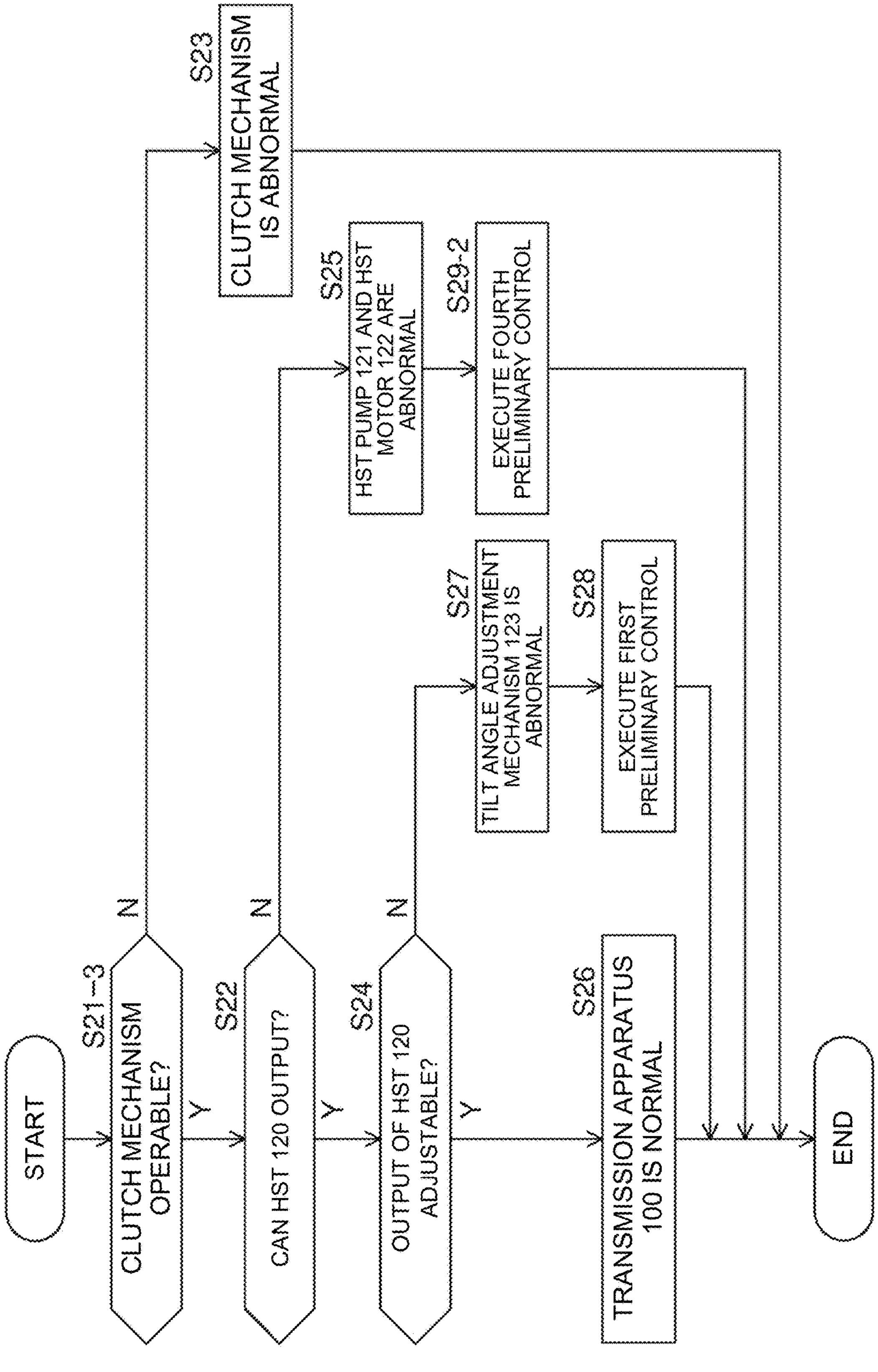
FIG. 22 is a flowchart illustrating a flow of the execution determination of the fourth preliminary control.

Next, a description will be made on a flow of the execution determination of the fourth preliminary control with reference to FIG. 22. FIG. 22 is a flowchart illustrating the flow of the execution determination of the fourth preliminary control.

Since some steps in the flowchart illustrated in FIG. 22 are the same as steps in the flowchart illustrated in FIG. 6 (and FIG. 9), the same steps will be denoted by the same reference signs.

In step S21-3, the controller CU determines whether at least one of the first preliminary control clutch group and the fourth preliminary control clutch group is operable.

If at least one of the first preliminary control clutch group and the fourth preliminary control clutch group is operable (Yes in step S21-3), the processing proceeds to next step S22.

If at least one in the first preliminary control clutch group is inoperable, and at least one in the fourth preliminary control clutch group is inoperable (No in step S21-3), the processing proceeds to step S23.

In step S23, the controller CU determines that the abnormality of the travel system 2*a* is the abnormality of the clutch mechanism that is included in the transmission apparatus 100.

Based on this determination, the operator may be notified that the transmission apparatus 100 (in particular, the clutch mechanism) is abnormal via the display unit described above.

In step S22, the controller CU determines whether the HST 120 can output. As described above, this determination is made on the basis of the detection information (the rotational speed of the HST output gear 122*b*) that is output from the output sensor OS.

In detail, this determination is made by comparing the above detection information and driving operation information that is generated in response to the operation of the plural steering members 26*b* (see FIG. 1) (for example, the operation of the gear shift lever) by the operator.

If the HST 120 is unable to output (No in step S22), the controller CU determines that the abnormality of the travel system 2*a* is the abnormality of (the impossibility to drive) at least one of the HST pump 121 and the HST motor 122 (step S25).

Then, in this case, the fourth preliminary control is executed (step S29-2). That is, in the case where the HST 120, in particular, at least one of the HST pump 121 and the HST motor 122 is abnormal, the fourth preliminary control is executed.

Here, an execution condition of the fourth preliminary control includes determining that the fourth preliminary control clutch group is operable in step S21-3.

If the HST 120 can output (Yes in step S22), the processing proceeds to next step S24.

Since steps (the flow) from step S24 onward are the same as steps (the flow) in the flowchart illustrated in FIG. 6 (and FIG. 9), the description thereon will not be made.

The following configuration is desirable from a viewpoint of reliably transmitting the power from the engine 22 to the drive wheels 24 in the configuration that the transmission apparatus 100 includes the output-side power transmission mechanism 140 capable of transmitting the power of the planetary gear mechanism 130 to the drive wheels 24.

That is, in the above fourth preliminary control, transmitting the power from the engine 22 to the drive wheels 24 via the input-side power transmission mechanism 110 and the planetary gear mechanism 130 desirably includes the following.

That is, it is desirable to include transmitting the power from the planetary gear mechanism 130 to the drive wheels 24 via the output-side power transmission mechanism 140.

The following configuration is desirable from a viewpoint of reliably transmitting the power from the planetary gear mechanism 130 to the drive wheels 24 in the configuration that the output-side power transmission mechanism 140 has the fourth clutch mechanism C4 (the first output-side clutch mechanism 141*a* in the first embodiment) that engages/disengages the planetary gear mechanism 130 with/from the drive wheels 24.

That is, in the fourth preliminary control described above, transmitting the power from the planetary gear mechanism 130 to the drive wheels 24 via the output-side power transmission mechanism 140 desirably includes bringing the fourth clutch mechanism C4 into the engaged state.

Figure 23:
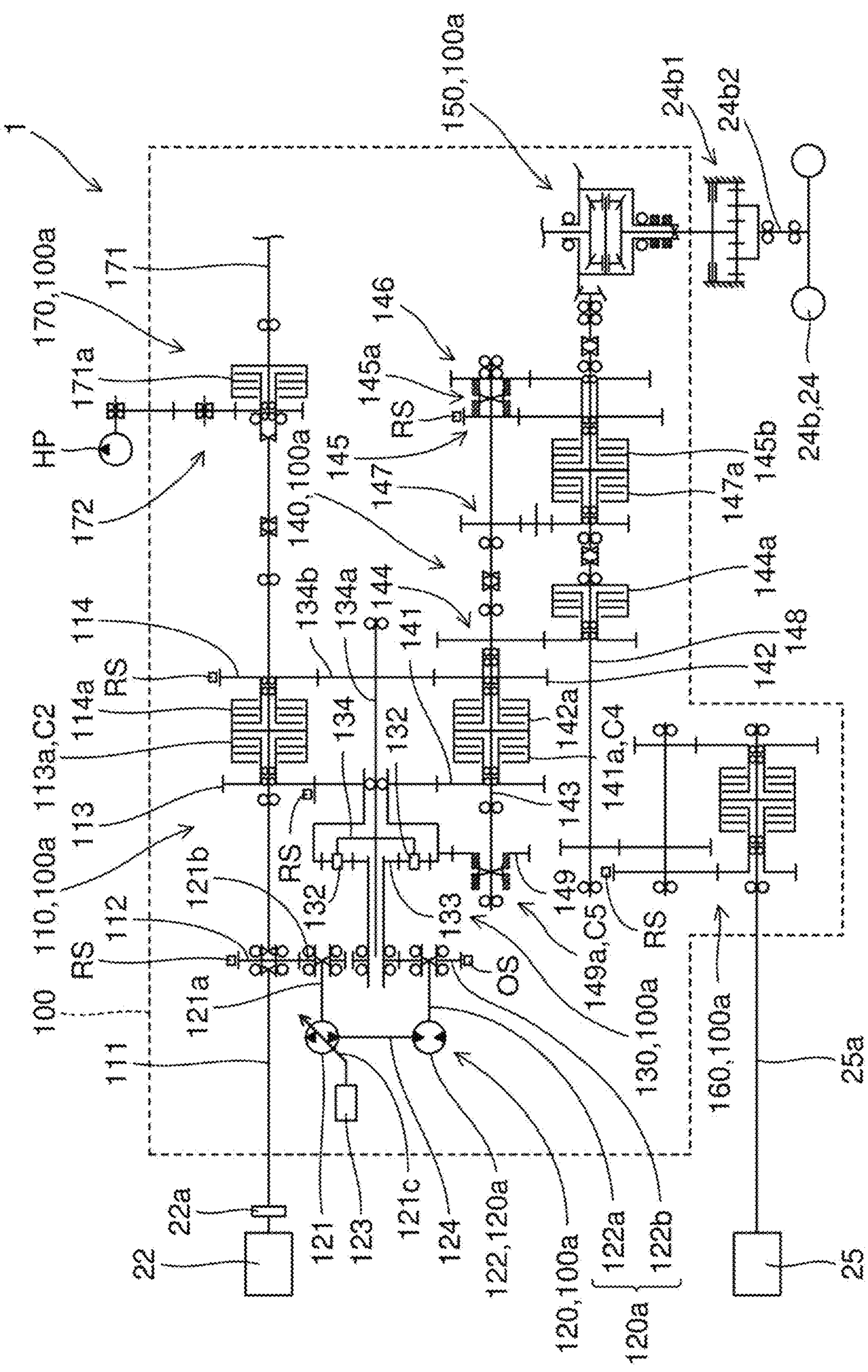
FIG. 23 is a schematic view illustrating a configuration of a transmission apparatus in a modified example 1.

Here, a description will be made on a modified example (a modified example 1) of the configuration of the transmission apparatus 100 according to the first embodiment with reference to FIG. 23. FIG. 23 is a schematic view illustrating a configuration of the transmission apparatus 100 in the modified example 1.

The transmission apparatus 100 illustrated in FIG. 23 has the same configuration as that of the transmission apparatus 100 illustrated in FIG. 12 except that the HST clutch mechanism 112*a*, the third input gear 115, and the third input-side clutch mechanism 115*a*, which are illustrated in FIG. 12 and the like as the input-side power transmission mechanism 110, are removed.

Similar to the modified example 2-3 (see FIG. 12) and the like, also in the modified example 1, the third output-side clutch mechanism 149*a* will also be referred to as the fifth clutch mechanism C5.

That is, the output-side power transmission mechanism 140 in the modified example 1 has the fifth clutch mechanism C5 (the third output-side clutch mechanism 149*a* in the modified example 1) that engages/disengages the planetary gear mechanism 130 with/from the drive wheels 24 and is dedicated to the times of abnormality of the HST 120.

Similar to the first embodiment, also in the modified example 1, the fourth preliminary control (and the first preliminary control) can be executed.

In detail, in the modified example 1, the first input-side clutch mechanism 113*a*, the third output-side clutch mechanism 149*a*, and the first forward clutch mechanism 144*a* are included in the fourth preliminary control clutch group. Accordingly, when the fourth preliminary control is executed, the controller CU brings the first input-side clutch mechanism 113*a*, the third output-side clutch mechanism 149*a*, and the first forward clutch mechanism 144*a* into the engaged state (see step S51 in FIG. 20).

That is, the fourth preliminary control includes bringing the fifth clutch mechanism C5 (the third output-side clutch mechanism 149*a* in the modified example 1) into the engaged state.

In this case, since the first input-side clutch mechanism 113*a* and the third output-side clutch mechanism 149*a* are in the engaged state, the power is transmitted from the input-side power transmission mechanism 110 to the output-side power transmission mechanism 140 via the ring gear 131.

In detail, the power of the input shaft 111 of the input-side power transmission mechanism 110 is input to the first composition output shaft 143 of the output-side power transmission mechanism 140 via the first input gear 113, the ring gear 131, and the third output gear 149.

Then, since the first forward clutch mechanism 144*a* is in the engaged state, the power is transmitted from the first composition output shaft 143 to the rear wheels 24*b*.

The following configuration is desirable from a viewpoint of realizing the configuration that enables the power transmission from the planetary gear mechanism 130 to the drive wheels 24 when the abnormality occurs to the HST 120, while maintaining the basic configuration 100*a* of the transmission apparatus 100.

That is, as in the modified example 1, the output-side power transmission mechanism 140 desirably has the fifth clutch mechanism C5 (the third output-side clutch mechanism 149*a* in the modified example 1) that engages/disengages the planetary gear mechanism 130 with/from the drive wheels 24 and is dedicated to the time of the abnormality of the HST 120.

In addition, the following configuration is desirable from a viewpoint of reliably transmitting the power from the planetary gear mechanism 130 to the drive wheels 24.

That is, in the fourth preliminary control, transmitting the power from the planetary gear mechanism 130 to the drive wheels 24 via the output-side power transmission mechanism 140 desirably includes bringing the fifth clutch mechanism C5 into the engaged state.

In the fourth preliminary control clutch group in the modified example 1, the second forward clutch mechanism 145*b* may be included, or the reverse clutch mechanism 147*a* may be included instead of the first forward clutch mechanism 144*a*.

5. Supplementary Description

In the present embodiments (the first embodiment, the second embodiment, and the third embodiment), the description has been made on the configuration that each of the clutch mechanisms is the friction multi-plate clutch mechanism of the electrohydraulic control type. However, the present invention is not limited thereto.

For example, each of the clutch mechanisms may be a mechanical friction single-plate clutch mechanism or an electromagnetic clutch that is switched between an engaged state and a disengaged state via a link or the like.

In the present embodiments (the first embodiment and the second embodiment), the description has been made on the configuration that the first input-side clutch mechanism 113*a* is the second clutch mechanism C2 and the first output-side clutch mechanism 141*a* is the fourth clutch mechanism C4. However, the present invention is not limited thereto.

For example, it may be configured that the second input-side clutch mechanism 114*a* is the second clutch mechanism C2 and the second output-side clutch mechanism 142*a* is the fourth clutch mechanism C4.

In the present embodiments (the first embodiment, the second embodiment, and the third embodiment), the description has been made on the configuration that the transmission apparatus 100 includes the output sensor OS. However, the present invention is not limited thereto.

For example, in the case where the transmission apparatus 100 includes a member that detects the output of the HST 120 instead of the output sensor OS, the output sensor OS may be removed.

The tractor 1 may have a configuration that drives a travel unit and a work unit by using an electric motor instead of the engine 22 (for example, an electric tractor).

6. Supplementary Notes

The transmission apparatus 100 that has been described in the present embodiment can also be expressed as transmission apparatuses described in following Supplementary Notes.

A transmission apparatus in Supplementary Note (1) includes:

a hydrostatic transmission that changes rotary power of an engine steplessly and outputs the changed rotary power;

a planetary gear mechanism that combines the rotary power of the engine and rotary power output from the hydrostatic transmission and outputs resultant power to a drive wheel;

an input-side power transmission mechanism capable of transmitting the rotary power of the engine to the hydrostatic transmission and the planetary gear mechanism; and a controller configured to transmit the power from the engine to the drive wheel via the input-side power transmission mechanism and the planetary gear mechanism when the hydrostatic transmission is abnormal.

In the transmission apparatus in Supplementary Note (1), in a transmission apparatus in Supplementary Note (2), the controller is configured to cancel power transmission from the engine to the hydrostatic transmission via the input-side power transmission mechanism when the hydrostatic transmission is abnormal.

In the transmission apparatus in Supplementary Note (2), in a transmission apparatus in Supplementary Note (3), the input-side power transmission mechanism includes a first clutch mechanism that engages/disengages the engine with/from the hydrostatic transmission, and that the controller is configured to cancel the power transmission from the engine to the hydrostatic transmission via the input-side power transmission mechanism includes bringing the first clutch mechanism into a disengaged state.

In the transmission apparatus in any one of Supplementary Notes (1) to (3), in a transmission apparatus in Supplementary Note (4), the input-side power transmission mechanism includes a second clutch mechanism that engages/disengages the engine with/from the planetary gear mechanism, and that the controller is configured to transmit the power from the engine to the drive wheel via the input-side power transmission mechanism and the planetary gear mechanism includes bringing the second clutch mechanism into an engaged state.

In the transmission apparatus in any one of Supplementary Notes (1) to (3), in a transmission apparatus in Supplementary Note (5), the input-side power transmission mechanism includes a third clutch mechanism that engages/disengages the engine with/from the planetary gear mechanism and is dedicated to times of abnormality of the hydrostatic transmission, and that the controller is configured to transmit the power from the engine to the drive wheel via the input-side power transmission mechanism and the planetary gear mechanism includes bringing the third clutch mechanism into an engaged state.

In the transmission apparatus in Supplementary Note (5), a transmission apparatus in Supplementary Note (6) includes:

an output-side power transmission mechanism capable of transmitting the rotary power that is output from the planetary gear mechanism to the drive wheel, in which that the controller is configured to transmit the power from the engine to the drive wheel via the input-side power transmission mechanism and the planetary gear mechanism includes transmitting the power from the planetary gear mechanism to the drive wheel via the output-side power transmission mechanism.

In the transmission apparatus in Supplementary Note (6), in a transmission apparatus in Supplementary Note (7), the output-side power transmission mechanism has a fourth clutch mechanism that engages/disengages the planetary gear mechanism with/from the drive wheel, and that the controller is configured to transmit the power from the planetary gear mechanism to the drive wheel via the output-side power transmission mechanism includes bringing the fourth clutch mechanism into an engaged state.

In the transmission apparatus in Supplementary Note (6), in a transmission apparatus in Supplementary Note (8), the output-side power transmission mechanism has a fifth clutch mechanism that engages/disengages the planetary gear mechanism with/from the drive wheel and is dedicated to the time of the abnormality of the hydrostatic transmission, and that the controller is configured to transmit the power from the planetary gear mechanism to the drive wheel via the output-side power transmission mechanism includes bringing the fifth clutch mechanism into the engaged state.

In the transmission apparatus in any one of Supplementary Notes (1) to (4), a transmission apparatus in Supplementary Note (9) includes:

an output-side power transmission mechanism capable of transmitting rotary power that is output from the planetary gear mechanism to the drive wheel, in which that the controller is configured to transmit the power from the engine to the drive wheel via the input-side power transmission mechanism and the planetary gear mechanism includes transmitting the power from the planetary gear mechanism to the drive wheel via the output-side power transmission mechanism.

In the transmission apparatus in Supplementary Note (9), in a transmission apparatus in Supplementary Note (10), the output-side power transmission mechanism has a fourth clutch mechanism that engages/disengages the planetary gear mechanism with/from the drive wheel, and that the controller is configured to transmit the power from the planetary gear mechanism to the drive wheel via the output-side power transmission mechanism includes bringing the fourth clutch mechanism into an engaged state.

In the transmission apparatus in Supplementary Note (9), in a transmission apparatus in Supplementary Note (11), the output-side power transmission mechanism has a fifth clutch mechanism that engages/disengages the planetary gear mechanism with/from the drive wheel and is dedicated to times of abnormality of the hydrostatic transmission, and that the controller transmits the power from the planetary gear mechanism to the drive wheel via the output-side power transmission mechanism includes bringing the fifth clutch mechanism into an engaged state.

A transmission apparatus in Supplementary Note (12) includes:

a hydrostatic transmission that changes rotary power of an engine steplessly and outputs the changed power;

a planetary gear mechanism that combines the rotary power of the engine and rotary power output from the hydrostatic transmission and outputs resultant power to a drive wheel;

a power takeoff mechanism that can take off the rotary power of the engine to the drive wheel and is dedicated to times of abnormality of the hydrostatic transmission; and a controller that is configured to transmit the power from the engine to the drive wheel via the power takeoff mechanism when the hydrostatic transmission is abnormal.

In the transmission apparatus in Supplementary Note (12), in a transmission apparatus in Supplementary Note (13), the power takeoff mechanism has a sixth clutch mechanism that engages/disengages the engine with/from the drive wheel, and that the controller is configured to transmit the power from the engine to the drive wheel via the power takeoff mechanism includes bringing the sixth clutch mechanism into an engaged state.

In the transmission apparatus in Supplementary Note (12) or (13), a transmission apparatus in Supplementary Note (14) includes:

a first transmission shaft unit that is coupled to the planetary gear mechanism; and a second transmission shaft unit that is coupled to the first transmission shaft unit, in which the power takeoff mechanism is coupled to any one of the first transmission shaft unit and the second transmission shaft unit.

In the transmission apparatus in any one of Supplementary Notes (1) to (14), in a transmission apparatus in Supplementary Note (15), the controller is configured to determine that the hydrostatic transmission is abnormal by sensing that the hydrostatic transmission is unable to output.

In the transmission apparatus in Supplementary Note (15), in a transmission apparatus in Supplementary Note (16), the hydrostatic transmission has:

an HST pump that is driven by the rotary power of the engine and discharges hydraulic oil; and an HST motor that is driven by the hydraulic oil discharged by the HST pump, in which the controller is configured to determine that the hydrostatic transmission is unable to output by sensing that at least one of the HST pump and the HST motor cannot be driven in the case where the hydrostatic transmission is unable to output.

A transmission apparatus in Supplementary Note (17) includes:

an electrically-controlled hydrostatic transmission that changes rotary power of an engine steplessly and outputs the changed power, the hydrostatic transmission being configured to output predetermined power at least in an uncontrolled state;

a planetary gear mechanism that combines the rotary power of the engine and rotary power output from the hydrostatic transmission and outputs resultant power to a drive wheel; and a controller that brings the hydrostatic transmission into the uncontrolled state when the hydrostatic transmission is abnormal.

In the transmission apparatus in Supplementary Note (17), in a transmission apparatus in Supplementary Note (18), the controller is configured to bring the hydrostatic transmission into an uncontrolled state when the hydrostatic transmission is unable to adjust output.

In the transmission apparatus in Supplementary Note (17), a hydrostatic transmission in Supplementary Note (19) includes:

an HST pump that is driven by the rotary power of the engine and discharges hydraulic oil, and an HST motor that outputs rotary power by the hydraulic oil from the HST pump;

a swash plate capable of increasing a discharge oil amount of the HST pump by increasing a tilt angle; and an electrically-controlled tilt angle adjustment mechanism capable of adjusting the tilt angle of the swash plate, in which the tilt angle adjustment mechanism is configured to tilt the swash plate to a maximum tilt angle in a non-energized state, and that the controller brings the hydrostatic transmission into an uncontrolled state includes bringing the tilt angle adjustment mechanism into the non-energized state.

In the transmission apparatus in Supplementary Note (19), in a transmission apparatus in Supplementary Note (20), the controller is configured to determine that the hydrostatic transmission is abnormal by sensing that the tilt angle adjustment mechanism cannot be controlled.

In the transmission apparatus in any one of Supplementary Notes (1) to (20), a transmission apparatus in Supplementary Note (21) includes:

an output sensor that detects output of the hydrostatic transmission, in which the abnormality determination of the hydrostatic transmission by the controller is made on the basis of detection information by the output sensor.

In the transmission apparatus in Supplementary Note (21), in a transmission apparatus in Supplementary Note (22), the output sensor is arranged in an output unit of the hydrostatic transmission.

The description has been made so far on the embodiment of the present invention. However, the scope of the present invention is not limited thereto, and can be expanded or modified to be implemented within the scope that does not depart from the gist of the invention.

INDUSTRIAL APPLICABILITY

The present invention can be used for work vehicles such as an agricultural machine and a construction machine.

REFERENCE SIGNS LIST

22 Engine
24 Drive wheel
100 Transmission apparatus
110 Input-side power transmission mechanism
120 Hydrostatic transmission
120*a* Output unit
121 HST pump
121*c* Swash plate
122 HST motor
123 Tilt angle adjustment mechanism
130 Planetary gear mechanism
140 Output-side power transmission mechanism
184 First transmission shaft unit
185 Second transmission shaft unit
190 Power takeoff mechanism
C1 First clutch mechanism
C2 Second clutch mechanism
C3 Third clutch mechanism
C4 Fourth clutch mechanism
C5 Fifth clutch mechanism
C6 Sixth clutch mechanism
OS Output sensor
CU Controller

The invention claimed is:

1. A transmission apparatus comprising:

a hydrostatic transmission that changes rotary power of an engine steplessly and outputs the changed power;

a planetary gear mechanism includes a sun gear, a carrier supporting a planetary gear and a ring gear, the sun gear receives rotary power output from the hydrostatic transmission;

an input-side power transmission mechanism include a first input-side clutch mechanism and a second input-side clutch mechanism, the first input-side clutch mechanism that allows the power transmission from the rotary power of the engine to the ring gear of the planetary gear mechanism to engage and release, the second input-side clutch mechanism that allows the power transmission from the rotary power of the engine to the carrier of the planetary gear mechanism to engage and release;

an output-side power transmission mechanism include a first output-side clutch mechanism and a second output-side clutch mechanism, the first output-side clutch mechanism that allows the power transmission from the ring gear of the planetary gear mechanism to a drive wheel to engage and release, the second output-side clutch mechanism that allows the power transmission from the carrier of the planetary gear mechanism to the drive wheel to engage and release; and a controller is configured to transmit the power from the engine to the drive wheel by engaging the first input-side clutch mechanism and the first output-side clutch mechanism and by releasing the second input-side clutch mechanism and the second output-side clutch mechanism when the hydrostatic transmission is abnormal.

2. The transmission apparatus according to claim 1, wherein the output-side power transmission mechanism is capable of transmitting rotary power that is output from the planetary gear mechanism to the drive wheel, and the controller is configured to transmit the power from the engine to the drive wheel via the input-side power transmission mechanism and the planetary gear mechanism, the controller is configured to transmit the power from the planetary gear mechanism to the drive wheel via the output-side power transmission mechanism.

3. The transmission apparatus according to claim 1, wherein the controller is configured to transmit power from the engine to the drive wheel by engaging the first input-side clutch mechanism that is capable of transmitting power from the engine to the ring gear and the second output-side clutch mechanism that is capable of transmitting power from a carrier input/output gear to the drive wheel and by releasing the second input-side clutch mechanism that is capable of transmitting power from the engine to the carrier input/output gear and the first output-side clutch mechanism that is capable of transmitting power from the ring gear to the drive wheels when the hydrostatic transmission is normal.

4. The transmission apparatus according to claim 1, wherein the controller is configured to transmit power from the engine to the drive wheel by engaging the second input-side clutch mechanism that is capable of transmitting power from the engine to a carrier input/output gear and the first output-side clutch mechanism that is capable of transmitting power from the ring gear to the drive wheels and by releasing the first input-side clutch mechanism that is capable of transmitting power from the engine to the ring gear and the second output-side clutch mechanism that is capable of transmitting power from the carrier input/output gear to the drive wheel when the hydrostatic transmission is normal.

5. A transmission apparatus comprising:

an electrically-controlled hydrostatic transmission that changes rotary power of an engine steplessly and outputs the changed power, the hydrostatic transmission outputting predetermined rotary power at least in an uncontrolled state;

a planetary gear mechanism that combines the rotary power of the engine and rotary power output from the hydrostatic transmission and outputs resultant power to a drive wheel, the planetary gear mechanism including a ring gear; and a controller that brings the hydrostatic transmission into an uncontrolled state when the hydrostatic transmission is abnormal, wherein the hydrostatic transmission includes:

an HST pump that is driven by the rotary power of the engine and discharges hydraulic oil, and an HST motor that outputs rotary power by the hydraulic oil from the HST pump;

a swash plate capable of increasing a discharge oil amount of the HST pump by increasing a tilt angle; and an electrically-controlled tilt angle adjustment mechanism capable of adjusting the tilt angle of the swash plate, wherein the tilt angle adjustment mechanism tilts the swash plate to a maximum tilt angle in a non-energized state, and the controller is configured to bring the hydrostatic transmission into an uncontrolled state, the controller brings the tilt angle adjustment mechanism into the non-energized state.

6. The transmission apparatus according to claim 5, wherein the planetary gear mechanism includes a sun gear, a carrier supporting a planetary gear and the ring gear, the sun gear receives rotary power output from the hydrostatic transmission; and the transmission apparatus further comprises:

an input-side power transmission mechanism include a first and second input-side clutch mechanism, the first input-side clutch mechanism that allows the power transmission from the rotary power of the engine to the ring gear of the planetary gear mechanism to engage and release, the second input-side clutch mechanism that allows the power transmission from the rotary power of the engine to the carrier of the planetary gear mechanism to engage and release;

an output-side power transmission mechanism include a first and second output-side clutch mechanism, the first output-side clutch mechanism that allows the power transmission from the ring gear of the planetary gear mechanism to the drive wheel to engage and release, the second output-side clutch mechanism that allows the power transmission from the carrier of the planetary gear mechanism to the drive wheel to engage and release.

7. The transmission apparatus according to claim 5, wherein the planetary gear mechanism includes a carrier supporting a planetary gear and the ring gear, the controller is configured to transmit power from the engine to the drive wheel by engaging a first input-side clutch mechanism that is capable of transmitting power from the engine to the ring gear and the second output-side clutch mechanism that is capable of transmitting power from a carrier input/output gear to the drive wheel and by releasing the second input-side clutch mechanism that is capable of transmitting power from the engine to the carrier input/output gear and the first output-side clutch mechanism that is capable of transmitting power from the ring gear to the drive wheels when the hydrostatic transmission is normal.

8. The transmission apparatus according to claim 5, wherein the planetary gear mechanism includes a carrier supporting a planetary gear and the ring gear, the controller is configured to transmit power from the engine to the drive wheel by engaging the second input-side clutch mechanism that is capable of transmitting power from the engine to a carrier input/output gear and the first output-side clutch mechanism that is capable of transmitting power from the ring gear to the drive wheels and by releasing the first input-side clutch mechanism that is capable of transmitting power from the engine to the ring gear and the second output-side clutch mechanism that is capable of transmitting power from the carrier input/output gear to the drive wheel when the hydrostatic transmission is normal.

9. A transmission apparatus comprising:

a hydrostatic transmission that changes rotary power of an engine steplessly and outputs the changed power;

a planetary gear mechanism includes a sun gear, a carrier supporting a planetary gear and a ring gear, the sun gear receives rotary power output from the hydrostatic transmission;

an input-side power transmission mechanism include a first input-side clutch mechanism and a second input-side clutch mechanism, the first input-side clutch mechanism that allows the power transmission from the rotary power of the engine to the ring gear of the planetary gear mechanism to engage and release, the second input-side clutch mechanism that allows the power transmission from the rotary power of the engine to the carrier of the planetary gear mechanism to engage and release;

an output-side power transmission mechanism include a first output-side clutch mechanism and a second output-side clutch mechanism, the first output-side clutch mechanism that allows the power transmission from the ring gear of the planetary gear mechanism to a drive wheel to engage and release, the second output-side clutch mechanism that allows the power transmission from the carrier of the planetary gear mechanism to the drive wheel to engage and release; and a controller is configured to transmit the power from the engine to the drive wheel by engaging the second input-side clutch mechanism and the second output-side clutch mechanism and by releasing the first input-side clutch mechanism and the first output-side clutch mechanism when the hydrostatic transmission is abnormal.

10. The transmission apparatus according to claim 9, wherein the controller is configured to transmit power from the engine to the drive wheel by engaging the first input-side clutch mechanism that is capable of transmitting power from the engine to the ring gear and the second output-side clutch mechanism that is capable of transmitting power from a carrier input/output gear to the drive wheel and by releasing the second input-side clutch mechanism that is capable of transmitting power from the engine to the carrier input/output gear and the first output-side clutch mechanism that is capable of transmitting power from the ring gear to the drive wheels when the hydrostatic transmission is normal.

11. The transmission apparatus according to claim 9, wherein the controller is configured to transmit power from the engine to the drive wheel by engaging the second input-side clutch mechanism that is capable of transmitting power from the engine to a carrier input/output gear and the first output-side clutch mechanism that is capable of transmitting power from the ring gear to the drive wheels and by releasing the first input-side clutch mechanism that is capable of transmitting power from the engine to the ring gear and the second output-side clutch mechanism that is capable of transmitting power from the carrier input/output gear to the drive wheel when the hydrostatic transmission is normal.

12. The transmission apparatus according to claim 9, wherein the output-side power transmission mechanism is capable of transmitting rotary power that is output from the planetary gear mechanism to the drive wheel, and the controller is configured to transmit the power from the engine to the drive wheel via the input-side power transmission mechanism and the planetary gear mechanism, the controller is configured to transmit the power from the planetary gear mechanism to the drive wheel via the output-side power transmission mechanism.

* * * * *